(12) United States Patent
Takahashi et al.

(10) Patent No.: US 8,039,142 B2
(45) Date of Patent: Oct. 18, 2011

(54) BATTERY CASE

(75) Inventors: Atsushi Takahashi, Aichi (JP); Toshio Takeshita, Kanagawa (JP); Yoichi Miyajima, Tokyo (JP)

(73) Assignee: Sony Corporation, Tokyo (JP)

( * ) Notice: Subject to any disclaimer, the term of this patent is extended or adjusted under 35 U.S.C. 154(b) by 1120 days.

(21) Appl. No.: 11/722,417

(22) PCT Filed: Nov. 4, 2005

(86) PCT No.: PCT/JP2005/020682
§ 371 (c)(1),
(2), (4) Date: Jun. 21, 2007

(87) PCT Pub. No.: WO2006/067918
PCT Pub. Date: Jun. 29, 2006

(65) Prior Publication Data
US 2010/0003585 A1    Jan. 7, 2010

(30) Foreign Application Priority Data

Dec. 21, 2004    (JP) .................................. 2004-368849

(51) Int. Cl.
*H01M 2/10*    (2006.01)
*H01M 2/22*    (2006.01)
(52) U.S. Cl. ......................................... 429/159; 429/99
(58) Field of Classification Search .................. None
See application file for complete search history.

(56) References Cited

U.S. PATENT DOCUMENTS

| 4,371,597 A | 2/1983 | Ikeda et al. |
| 4,431,717 A | 2/1984 | Kikuchi |
| 2003/0215702 A1 | 11/2003 | Tanjou et al. |
| 2004/0070366 A1 | 4/2004 | Takeshita et al. |

FOREIGN PATENT DOCUMENTS

| EP | 1 422 770 | 5/2004 |
| JP | 2001 266826 | 9/2001 |
| JP | 2003-86155 | 3/2003 |

OTHER PUBLICATIONS

U.S. Appl. No. 12/845,443, filed Jul. 28, 2010, Takeshita, et al.
U.S. Appl. No. 12/845,437, filed Jul. 28, 2010, Takeshita, et al.

*Primary Examiner* — Jonathan Crepeau
(74) *Attorney, Agent, or Firm* — Oblon, Spivak, McClelland, Maier & Neustadt, L.L.P.

(57) ABSTRACT

The present invention provides a battery including a case, a connector, the holding member, and a resilient conductive plate. In the case, two battery cells each in the form of a flattened rectangular plate are accommodated. The connector is exposed from the case. The holding member is for holding the two battery cells in the case. The holding member is made of a nonconductive resilient material and has a first battery accommodating section and a second battery accommodating section in which the battery cells each in the form of a flattened rectangular plate are accommodated in a juxtaposed relationship so as to form a rectangular shape as viewed in plan. The resilient conductive plate extends on the holding member for electrically connecting the two battery cells accommodated in the first and second battery accommodating sections and the connector to each other.

22 Claims, 26 Drawing Sheets

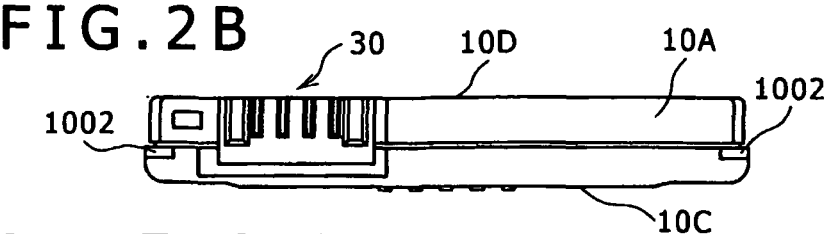
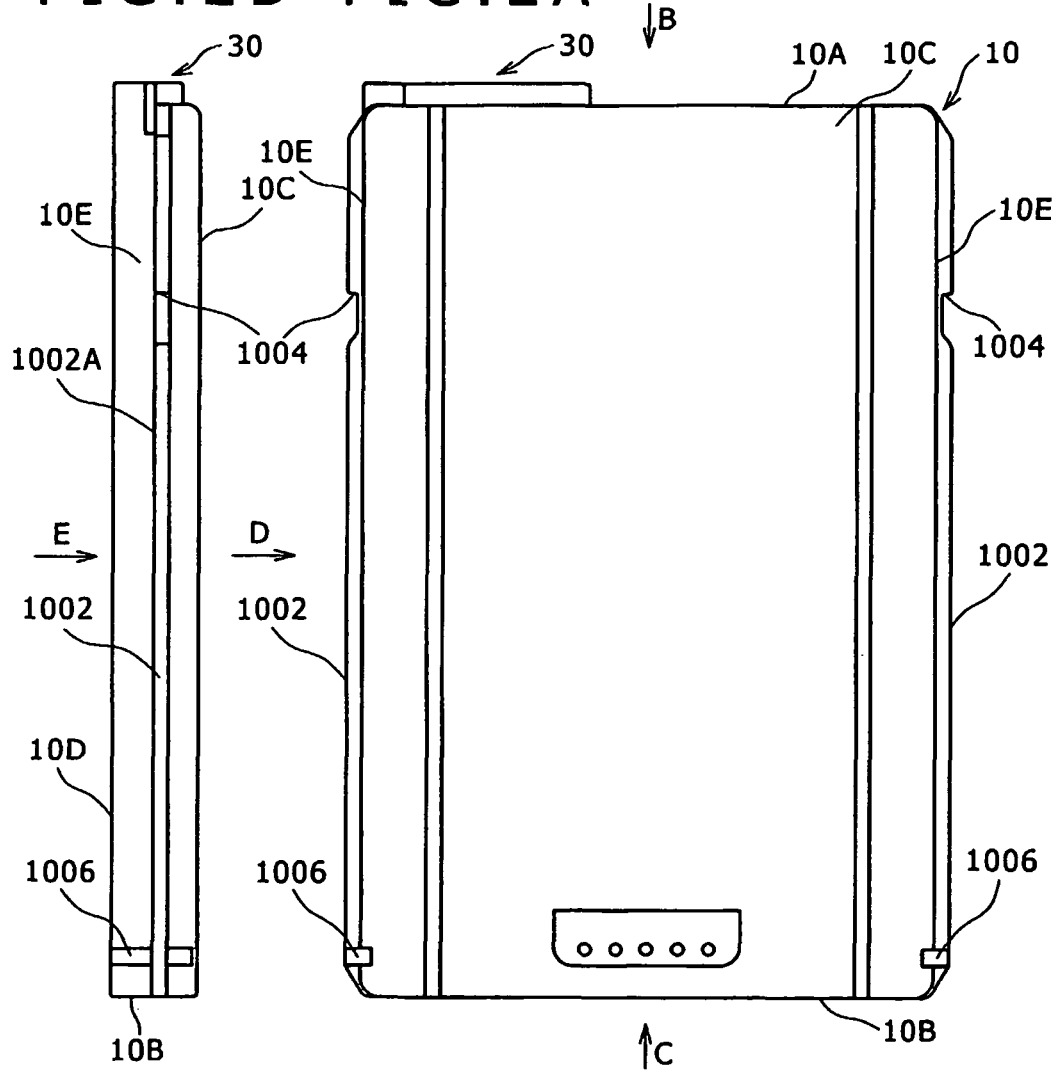
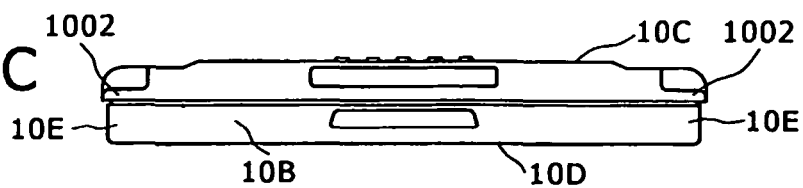

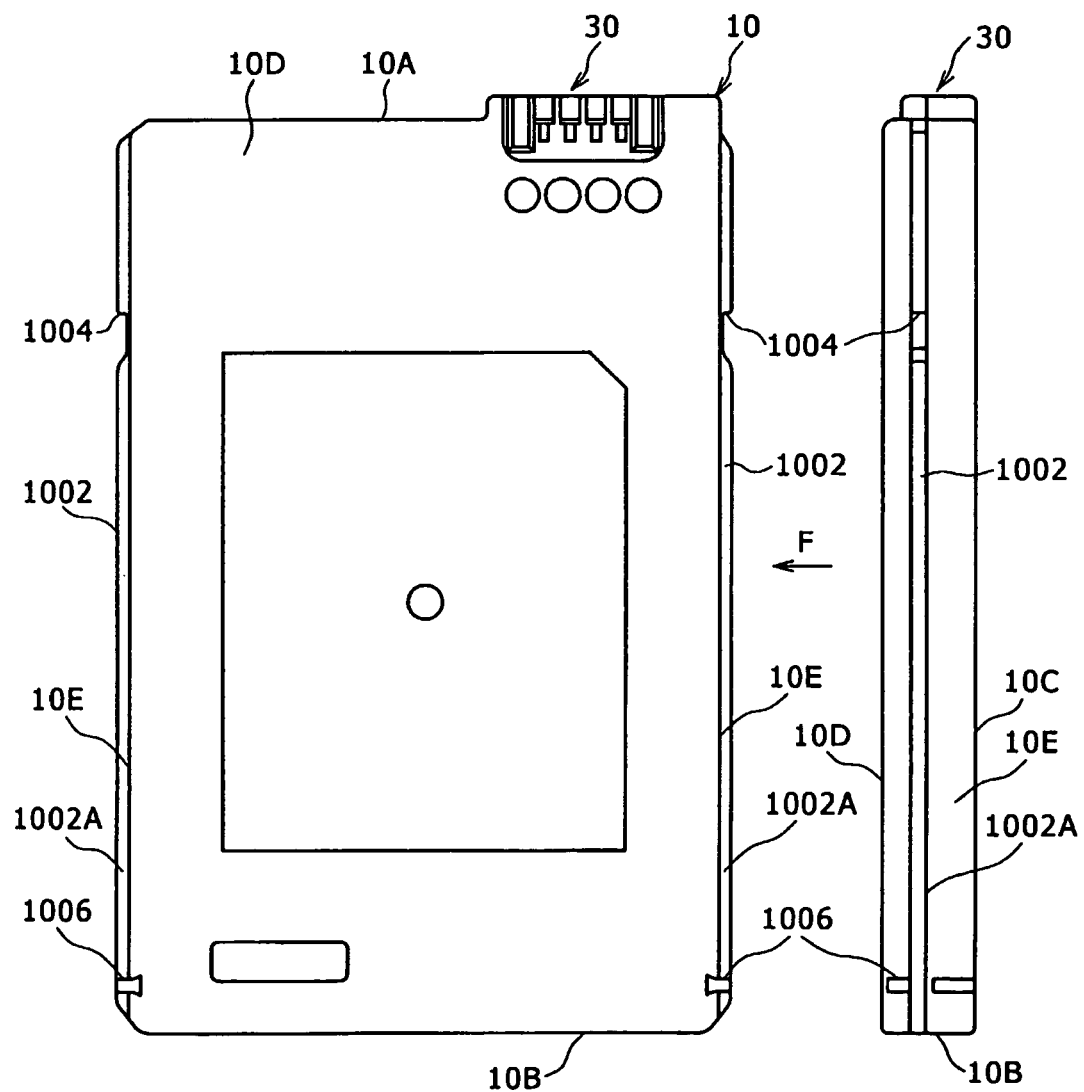

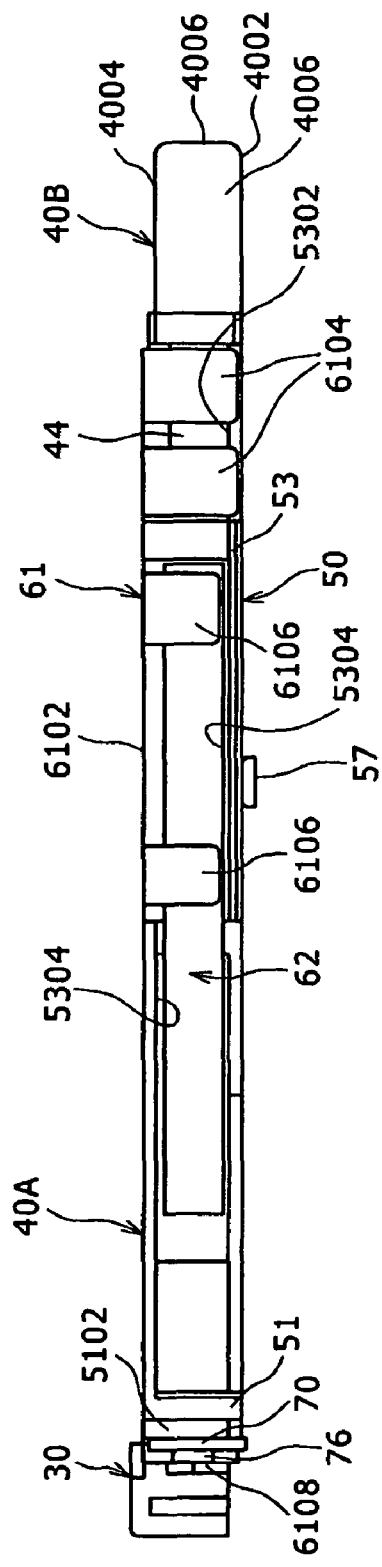
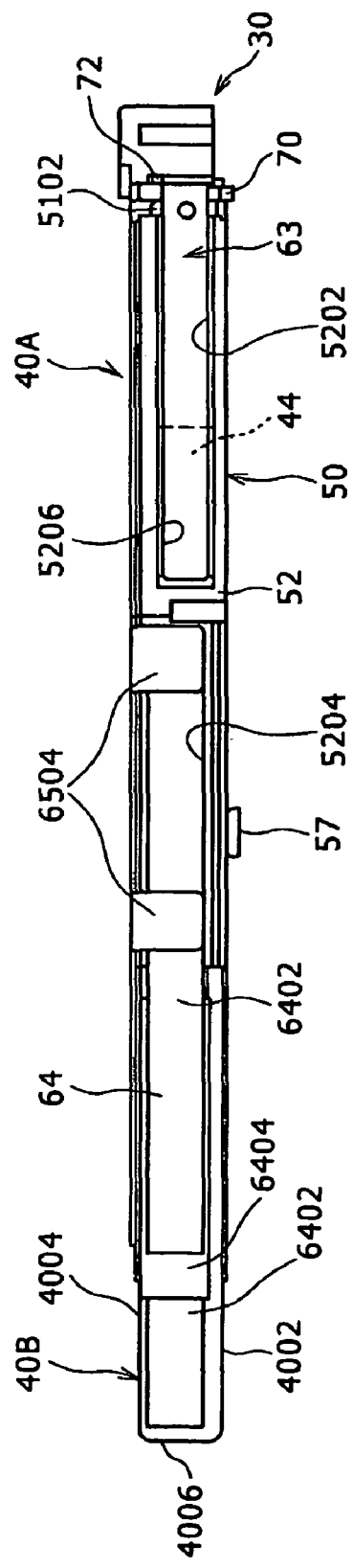
FIG.14A
FIG.14B

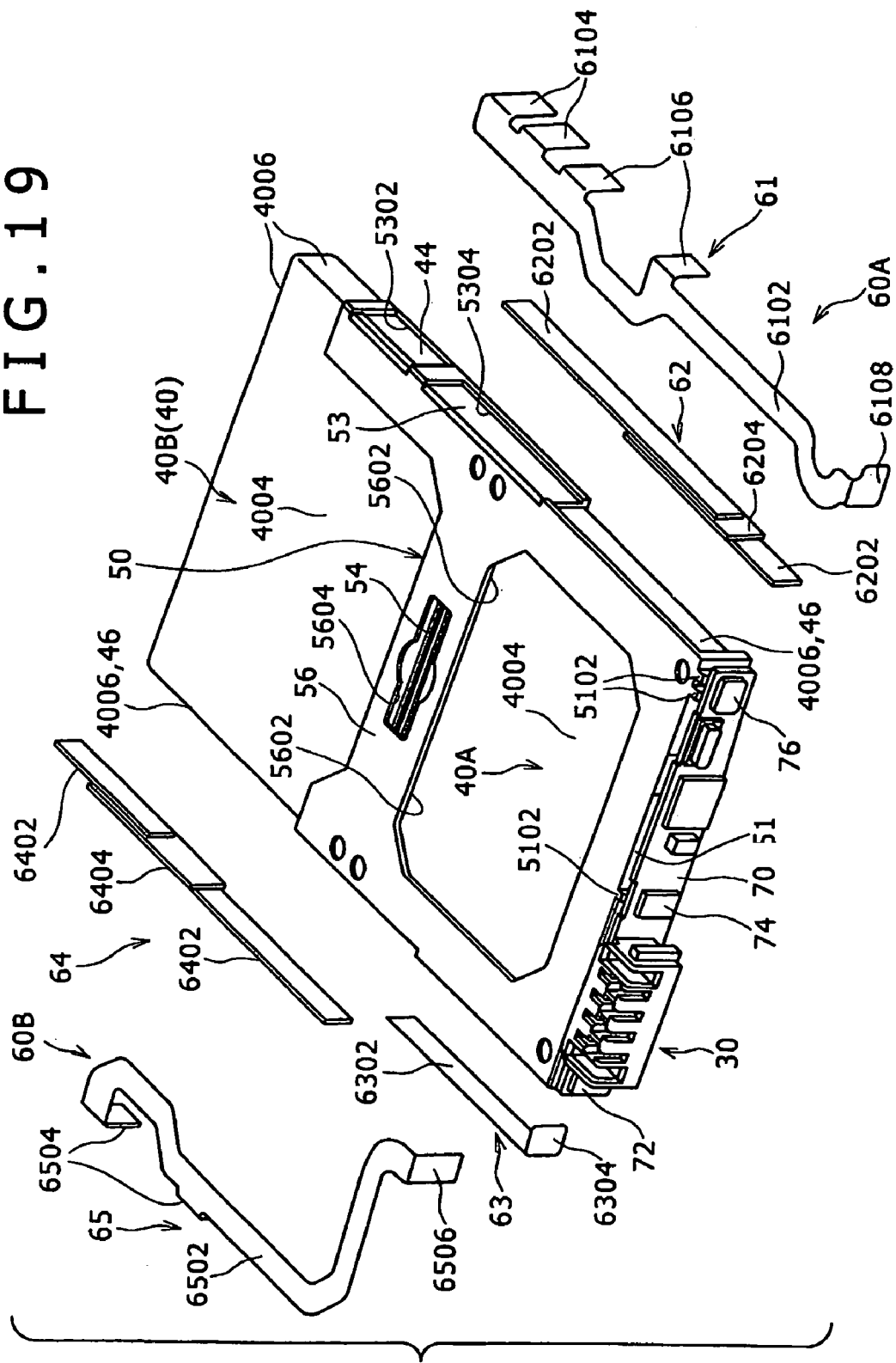

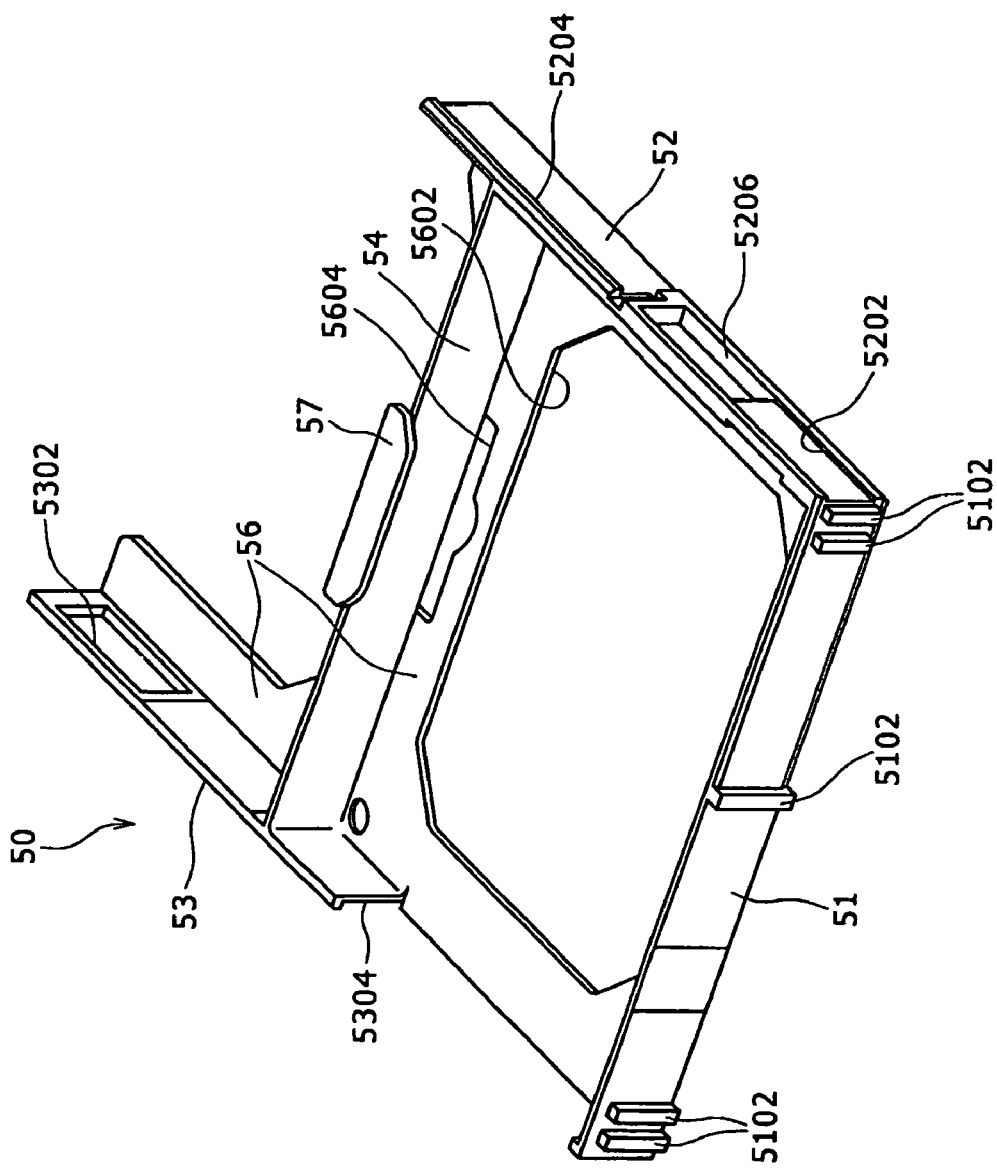

BATTERY CASE

TECHNICAL FIELD

This invention relates to a battery adapted to be removably loaded in an electronic apparatus.

The present invention contains subject matter related to Japanese Patent Application JP 2004-368849 filed in the Japanese Patent Office on Dec. 21, 2004, the entire contents of which being incorporated herein by reference.

BACKGROUND ART

A battery includes a case in which a battery cell is accommodated, a connector exposed from the case, conductive plates for individually connecting the positive terminal and the negative terminal of the battery cell to the connector and so forth.

The battery cell includes a sheath can made of a conductive metal material and having a form of a flattened rectangular plate. The positive terminal of the battery cell is formed in an isolated condition from the sheath can on one of four side faces of the sheath can while the remaining location of the sheath can other than the location at which the positive terminal is provided is formed as the negative terminal of the battery cell. A battery cell of the type described is disclosed, for example, in Japanese Patent Laid-Open No. 2001-266826.

In recent years, a battery in which a plurality of battery cells of the type described are accommodated in a case has been and is being provided. In batteries in related art of the type described, the battery cells are juxtaposed while electric isolation between the battery cells is assured by interposing a double-sided adhesive tape and insulating paper between the sheath cans of the battery cells. Similarly, a double-sided adhesive tape and insulating paper are interposed also between the conductive plates and the battery cells to assure electric isolation between the battery cells and the conductive plates and simultaneously secure the battery cells and the conductive plates.

DISCLOSURE OF INVENTION

Accordingly, in such batteries in related art as described above, a plurality of pieces of insulating paper and a plurality of double-sided adhesive tapes must be adhered to the surfaces of the sheath cans of the battery cells. This makes miniaturization of a battery difficult and requires a great number of parts and besides makes production of the battery complicated.

It is desirable to provide a battery which can achieve miniaturization and reduction in number of parts and can be assembled in high workability.

According to an embodiment of the present invention, a holding member having a battery accommodating chamber in which battery cells are accommodated is provided in the inside of a case.

More particularly, according to an embodiment of the present invention, a battery includes a case in which two battery cells each in the form of a flattened rectangular plate are accommodated, a connector exposed from the case, a holding member for holding the two battery cells in the case, and a resilient conductive plate. The holding member is made of a nonconductive resilient material and has a first battery accommodating section and a second battery accommodating section in which the two battery cells each in the form of a flattened rectangular plate are accommodated in a juxtaposed relationship so as to form a rectangular shape as viewed in plan. The resilient conductive plate extends on the holding member for electrically connecting the two battery cells accommodated in the first and second battery accommodating sections and the connector to each other.

In the battery, the two battery cells are held in an isolated condition from each other by the holding member, and the conductive plate is disposed so as extend along the holding member while being isolated from the battery cells by the holding member. Therefore, when compared with an alternative case that insulating paper or a double-sided adhesive tape is used to assure isolation between the battery cells, fixation of the battery cells to each other, and isolation between the battery cells and the conductive plate as in the case of the battery in related art described hereinabove, miniaturization of the battery can be anticipated, the number of parts can be reduced significantly, and assembly can be simplified. Consequently, the cost can be reduced.

According to another embodiment of the present invention, a battery includes a case in which a battery cell in the form of a flattened rectangular plate is accommodated, a connector exposed from the case, a holding member for holding the battery cell in the case, and a resilient conductive plate. The holding member is made of a nonconductive resilient material and has a battery accommodating section in which the battery cell is accommodated. The resilient conductive plate extends on the holding member for electrically connecting the battery cell accommodated in the battery accommodating section and the connector to each other.

BRIEF DESCRIPTION OF DRAWINGS

FIG. 2A is a plan view of the battery;

FIG. 2B is a view as viewed in the direction indicated by an arrow mark B of FIG. 2A;

FIG. 2C is a view as viewed in the direction indicated by an arrow mark C of FIG. 2A;

FIG. 2D is a view as viewed in the direction indicated by an arrow mark D of FIG. 2A;

FIG. 2E is a view as viewed in the direction indicated by an arrow mark E of FIG. 2D;

FIG. 2F is a view as viewed in the direction indicated by an arrow mark F of FIG. 2E;

FIG. 14A is a view as viewed in the direction indicated by an arrow mark A in FIG. 12;

FIG. 14B is a view as viewed in the direction indicated by an arrow mark B in FIG. 12;

FIG. 19 is an exploded perspective view of the battery cell, the holding member and a conductive plate of the battery;

FIG. 21 is a perspective view of the holding member,

BEST MODE FOR CARRYING OUT THE INVENTION

Figure 1:
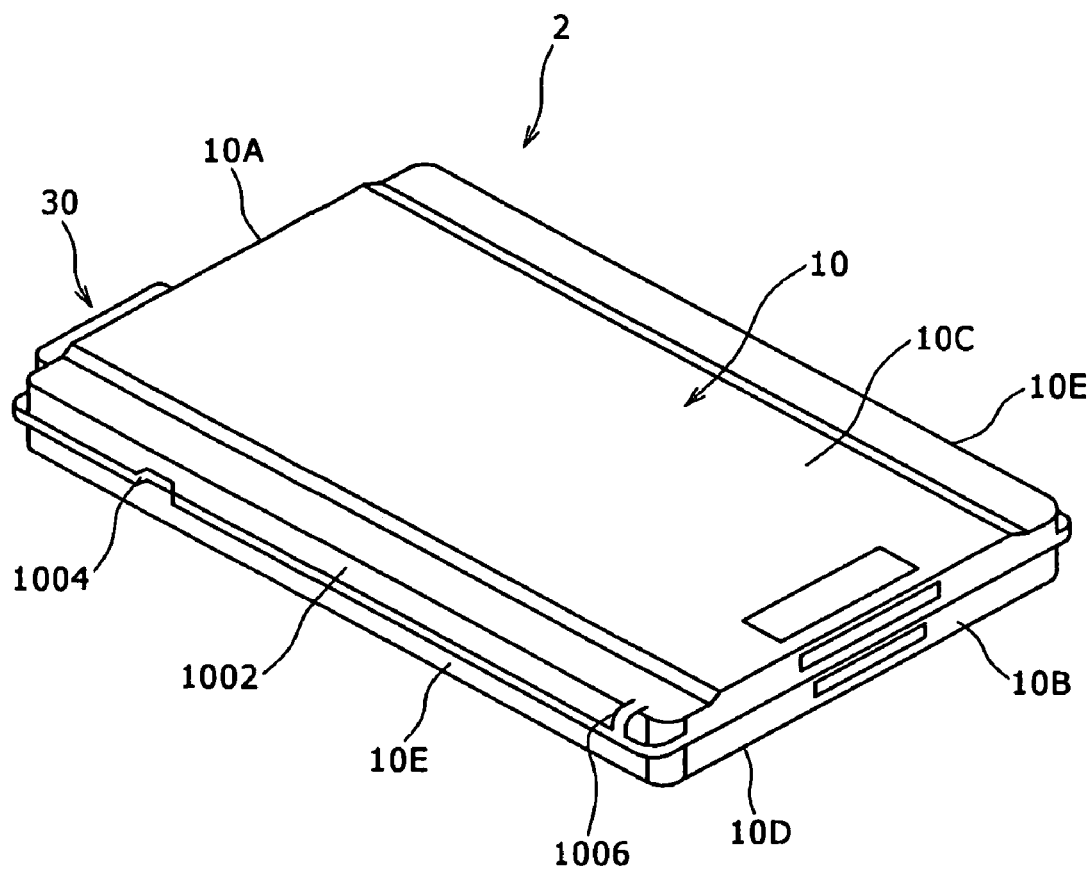
FIG. 1 is a perspective view of a battery according to a first embodiment of the present invention.
Figure 3B:
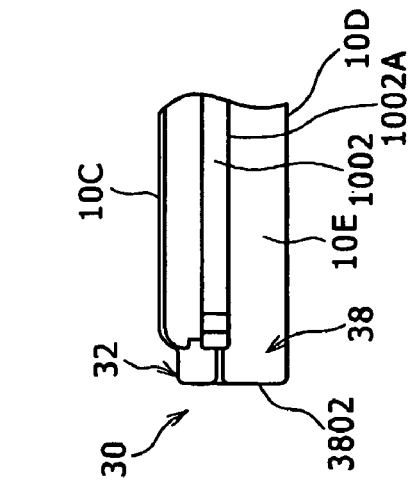
FIG. 3B is a view as viewed in the direction indicated by an arrow mark B of FIG. 3A.
Figure 3A:
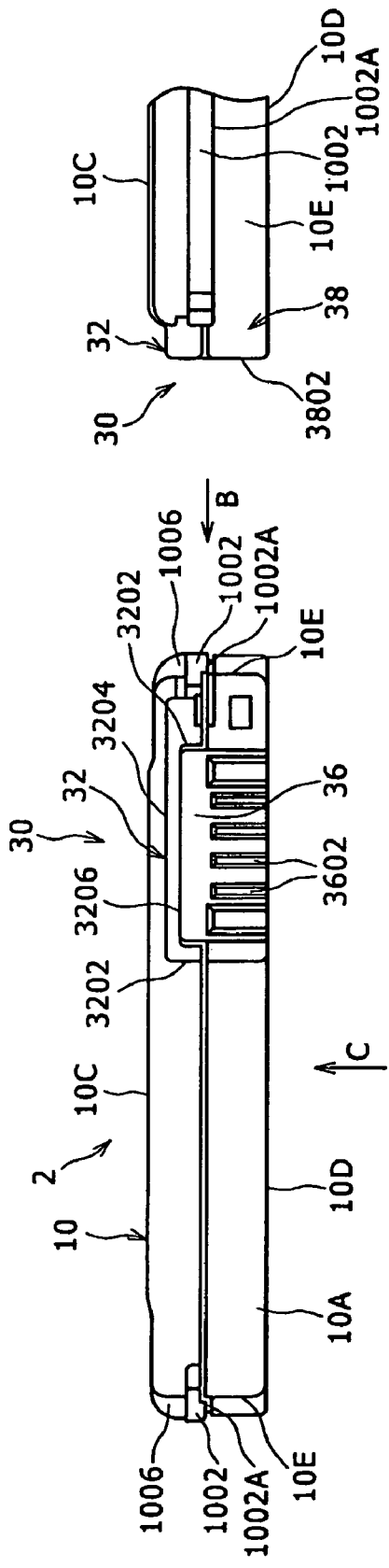
FIG. 3A is a front elevational view of the battery.
Figure 3C:
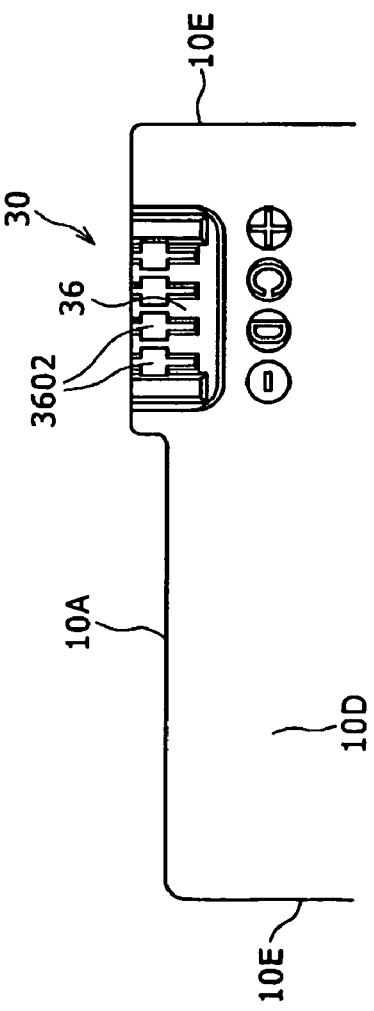
FIG. 3C is a view as viewed in the direction indicated by an arrow mark C of FIG. 3A.

An embodiment of the present invention is described below with reference to the drawings.

Referring first to FIGS. 1 to 5, there is shown a battery to which the present invention is applied. The battery 2 shown is removably loaded into a battery accommodating chamber, for example, of an electronic apparatus. The battery 2 includes a case 10 for accommodating two battery cells 40, a connector 30 exposed from the case 10, a holding member 50 for holding the battery cells 40 in the case 10, a conductive plate 60, and a printed circuit board 70.

The case 10 is formed in the form of a flattened rectangular plate having an upper face 10C and a lower face 10D positioned at the opposite ends in the direction a thickness, a pair of left and right side faces 10E positioned at the opposite ends in the direction of a width having a dimension greater than the thickness, and a front side face 10A and a rear side face 10B positioned at the opposite ends of a length in a forward and backward direction having a dimension greater than the width. It is to be noted that the leftward and rightward direction of the case 10 is represented as that as viewed from forwardly of the case 10.

An engaging wall 1002 is provided on each of the two side faces 10E such that it projects outwardly in a widthwise direction and extends in the lengthwise direction. The engaging walls 1002 are provided at locations of the side faces 10E displaced to the upper face 10C or the lower face 10D with respect to the central portion of the side faces 10E in the thicknesswise direction, in the resent embodiment, at locations of the side faces 10E displaced to the upper face 10C.

A cutaway portion 1004 for preventing letting off is formed at an intermediate portion of each of the engaging walls 1002 in the extension direction. In the present embodiment, the cutaway portion 1004 is formed at a location of each engaging wall 1002 rather near to the front face 10A.

The engaging wall 1002 is engaged, when the battery 2 is inserted into the battery accommodating chamber, with an engaging groove (not shown) provided in the battery accommodating chamber to position the battery 2 in the thicknesswise direction in the battery accommodating chamber.

Further, in a state that the battery 2 is inserted in the battery accommodating chamber and the connector 30 and an electronic apparatus side connector section are coupled to each other, a letting off preventing projection (not shown) provided in the battery accommodating chamber is releasably engaged with the cutaway portion 1004 thereby to stabilize the loaded state of the battery 2.

Further, a stopper wall 1006 is formed in a swollen state at a location of each of the two side faces 10E rather near to the rear face 10B. The stopper walls 1006 are connected to the engaging walls 1002 so that the rear face 10B of the battery may not be inserted into the battery accommodating chamber of the electronic apparatus and serve as reverse insertion preventing walls.

Figure 6:
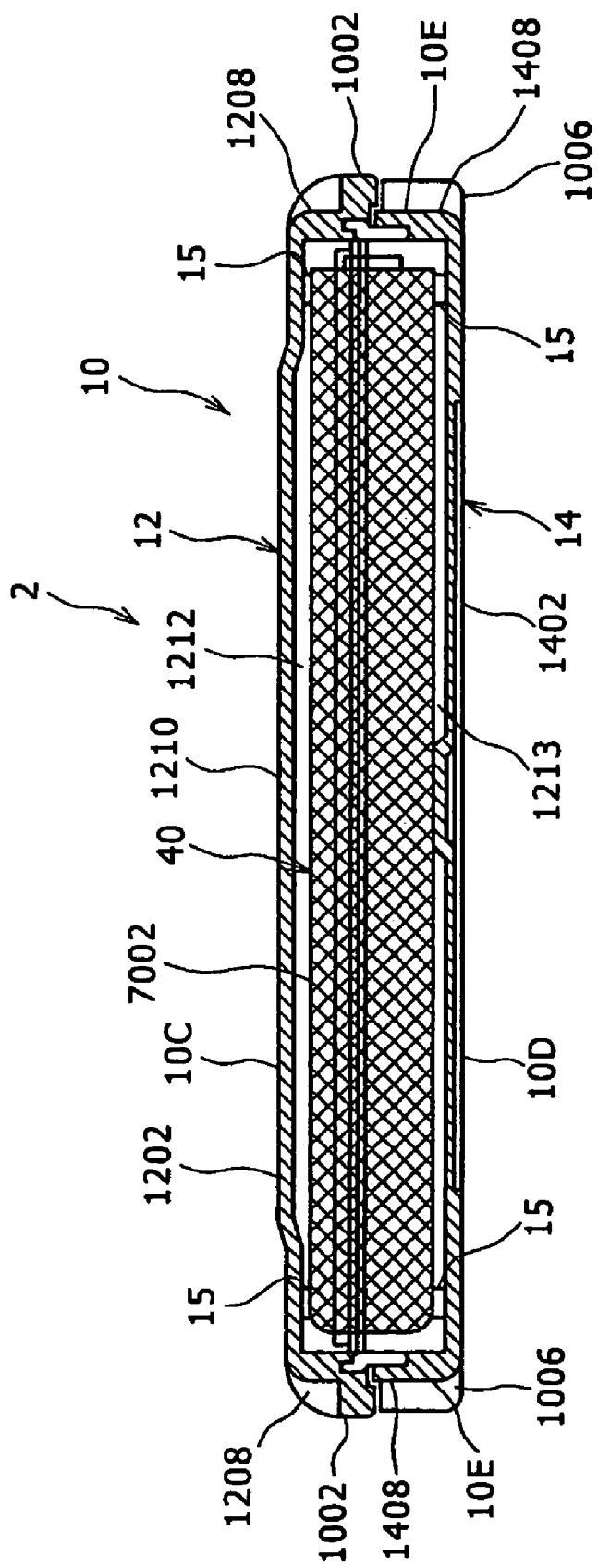
FIG. 6 is a sectional view of the battery.
Figure 7:
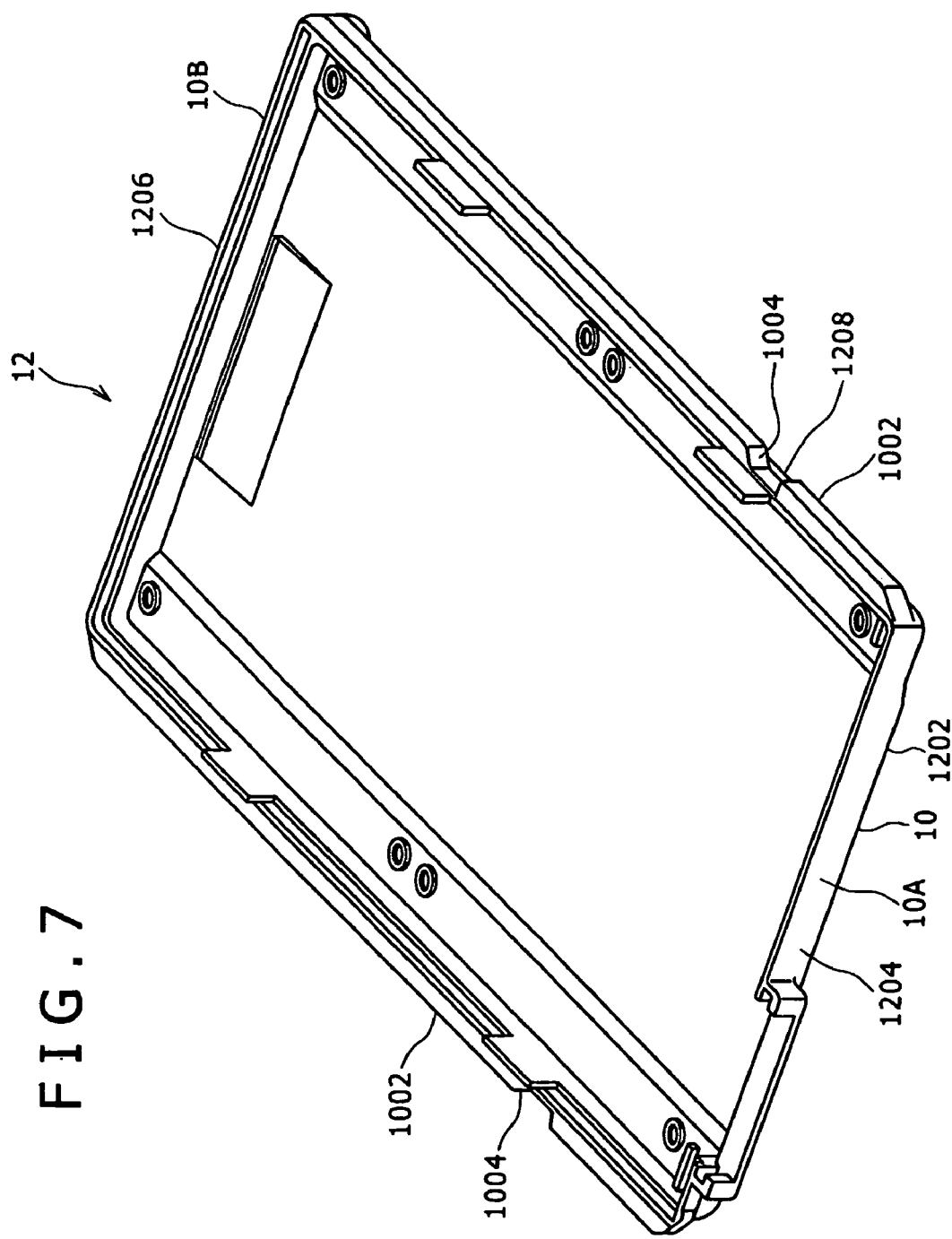
FIG. 7 is a perspective view of an upper case of the battery.
Figure 8:
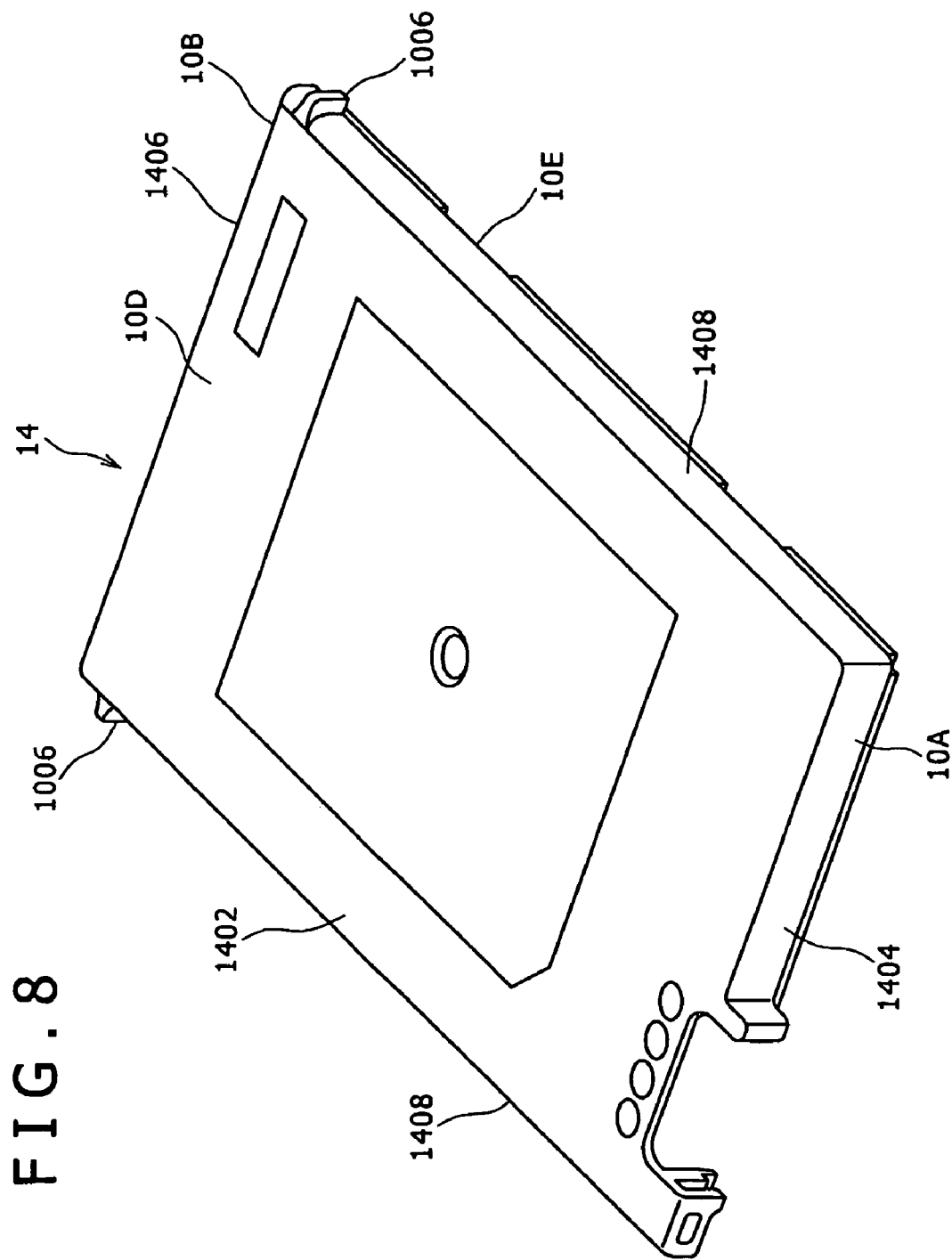
FIG. 8 is a perspective view of a lower case of the battery.

In the present embodiment, the case 10 is formed by two cases including an upper case 12 and a lower case 14 coupled to each other by welding as seen in FIGS. 6, 7 and 8.

In the present embodiment, the upper face 10C is formed from an upper face 1202 of the upper case 12 while the lower face 10D is formed from a tower face 1402 of the lower case 14. Further, the front face 10A is formed from lower front faces 1204 and 1404 of the upper face 12 and the lower case 14, and the rear face 10B is formed from rear faces 1206 and 1406 of the upper case 12 and the lower case 14. Furthermore, each of the side faces 10E is formed from side faces 1208 and 1408 of the upper case 12 and the lower case 14.

Further, the engaging walls 1002 are formed on the side faces of the upper case 12, and the stopper walls 1006 are formed on the side faces of the lower case 14.

Further, in the present embodiment, a plurality of projections 15 are formed at different peripheral locations on an inner face of the upper face 1202 of the upper case 12 and at different peripheral locations on an inner face of the lower face 1402 of the lower case 14 as seen in FIG. 6. The battery cells 40 are held in the case 10 by the projections 15.

Further, in the present embodiment, a displaced portion 1210 is formed on the upper face 1202 of the upper case 12 such that it is displaced upwardly at a central portion of the upper face 1202 in the widthwise direction over the overall length in the lengthwise direction with respect to the remaining portions of the upper face 1202 near to the opposite sides in the widthwise direction. Meanwhile, another displaced portion 1211 is formed on the lower face 1402 of the lower case 14 such that it is displaced at a central portion of the lower face 1402 in the widthwise direction over the overall length in the lengthwise direction with respect to the remaining portions of the lower face 1402 near to the opposite sides in the widthwise direction. Gaps 1212 and 1213 are formed between the inner faces of the displaced portions 1210 and 1211 and an upper face 4002 and a lower face 4004 of the battery cells 40 accommodated in the case 10 such that they absorb, when the battery cells 40 are expanded upon charging, the expansion.

Referring to FIGS. 1 to 6, the connector 30 is provided on the front side face 10A of the case 10 such that it projects forwardly. In the present embodiment, the connector 30 is provided at a location of the front side face 10A rather near to a right end in the widthwise direction and extends in the widthwise direction.

The position of the connector 30 in the thicknesswise direction on the front side face 10A is determined with reference to faces, which oppose to the upper face 10C or the lower face 10D, of the engaging walls 1002 of the left and right side faces 10E. In the present embodiment, the faces 1002A of the engaging walls 1002, which oppose to the lower face 10D, make a reference to the position of the connector 30 in the thicknesswise direction.

Referring to FIGS. 3A to 3C and 9, the connector 30 has a channel-shaped connector wall section 32 swollen in the lengthwise direction from the front side face 10A. The connector 30 has a terminal forming member 36 disposed on the inner side of the connector wall portion 32, and a contact section 33 connected to the battery cells 40.

The connector wall section 32 is provided to reinforce the connector 30 and has a pair of vertical walls 3202 spaced from each other in the widthwise direction and extending in the thicknesswise direction, and a transverse wall 3204 extending in the widthwise direction at a location rather near to the upper face 10C and interconnecting end portions of the vertical walls 3202 in the thicknesswise direction.

The vertical walls 3202 and the transverse wall 3204 cooperatively define the space 3206, which is open in the lengthwise direction (forwardly) and is open to the other face (downwardly) from between the faces at the opposite ends in the thicknesswise direction.

Figure 4:
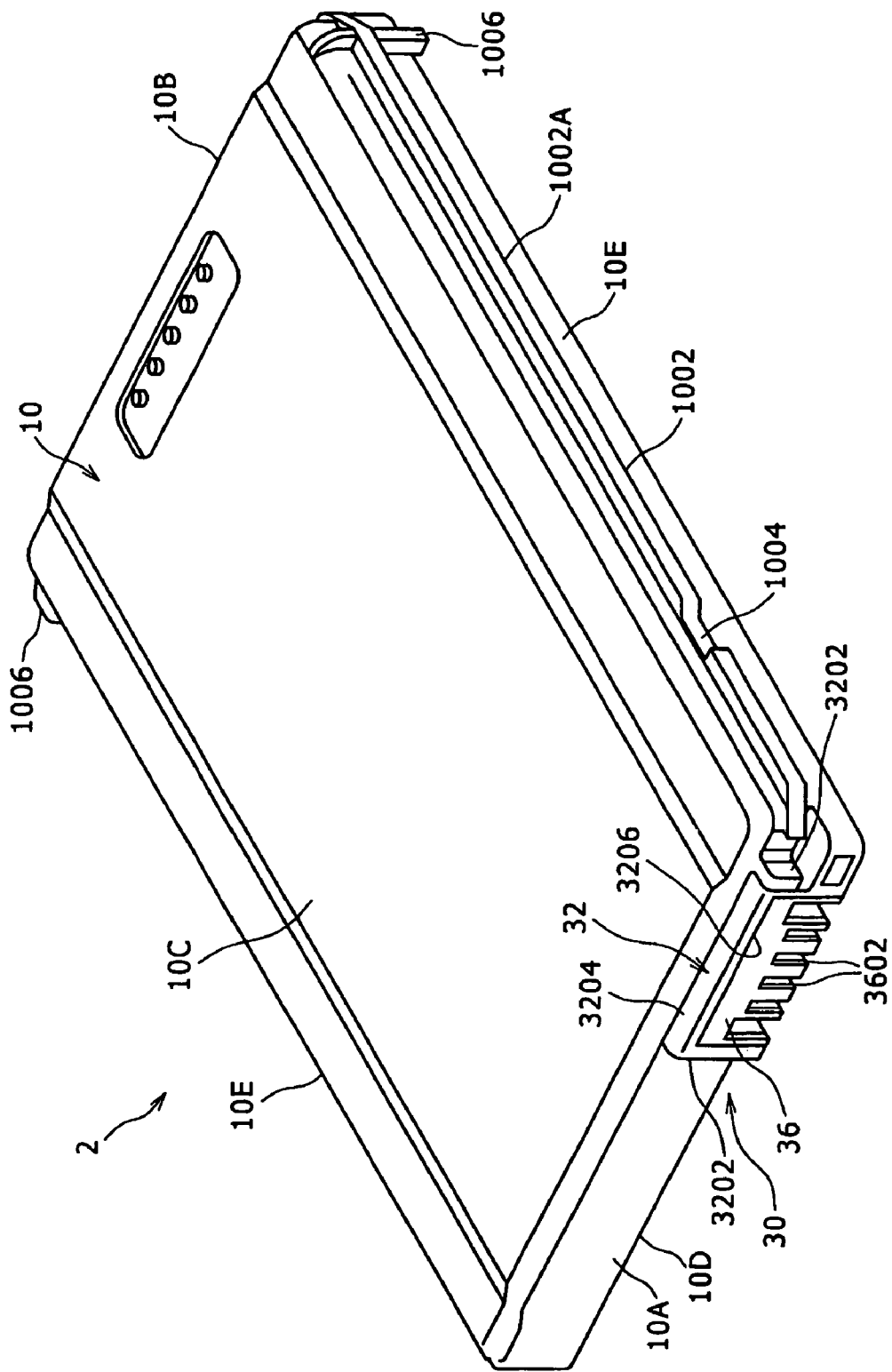
FIG. 4 is a perspective view of the battery as viewed from an obliquely forwardly upward direction.
Figure 5:
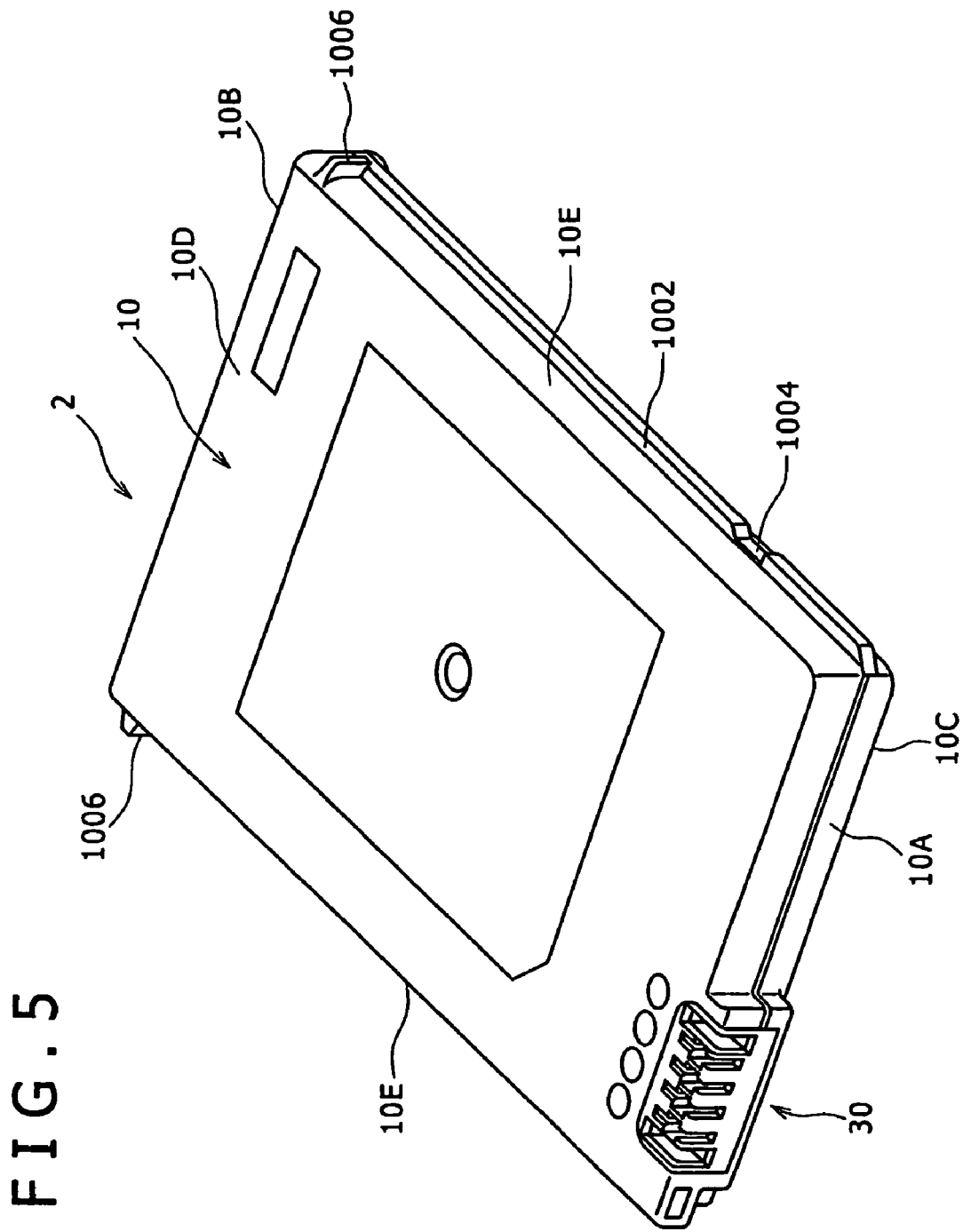
FIG. 5 is a perspective view of the battery in a reversed state as viewed from an oblique upward direction.
Figure 9:
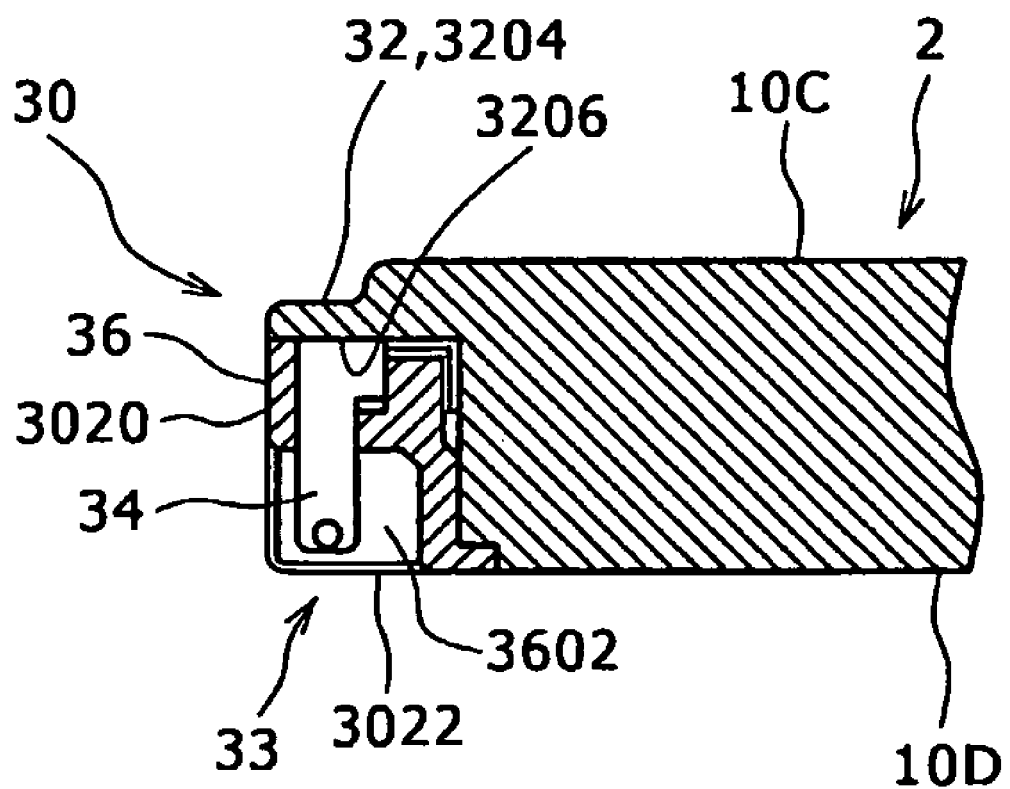
FIG. 9 is a sectional view of a connector section of the battery.
Figure 10:
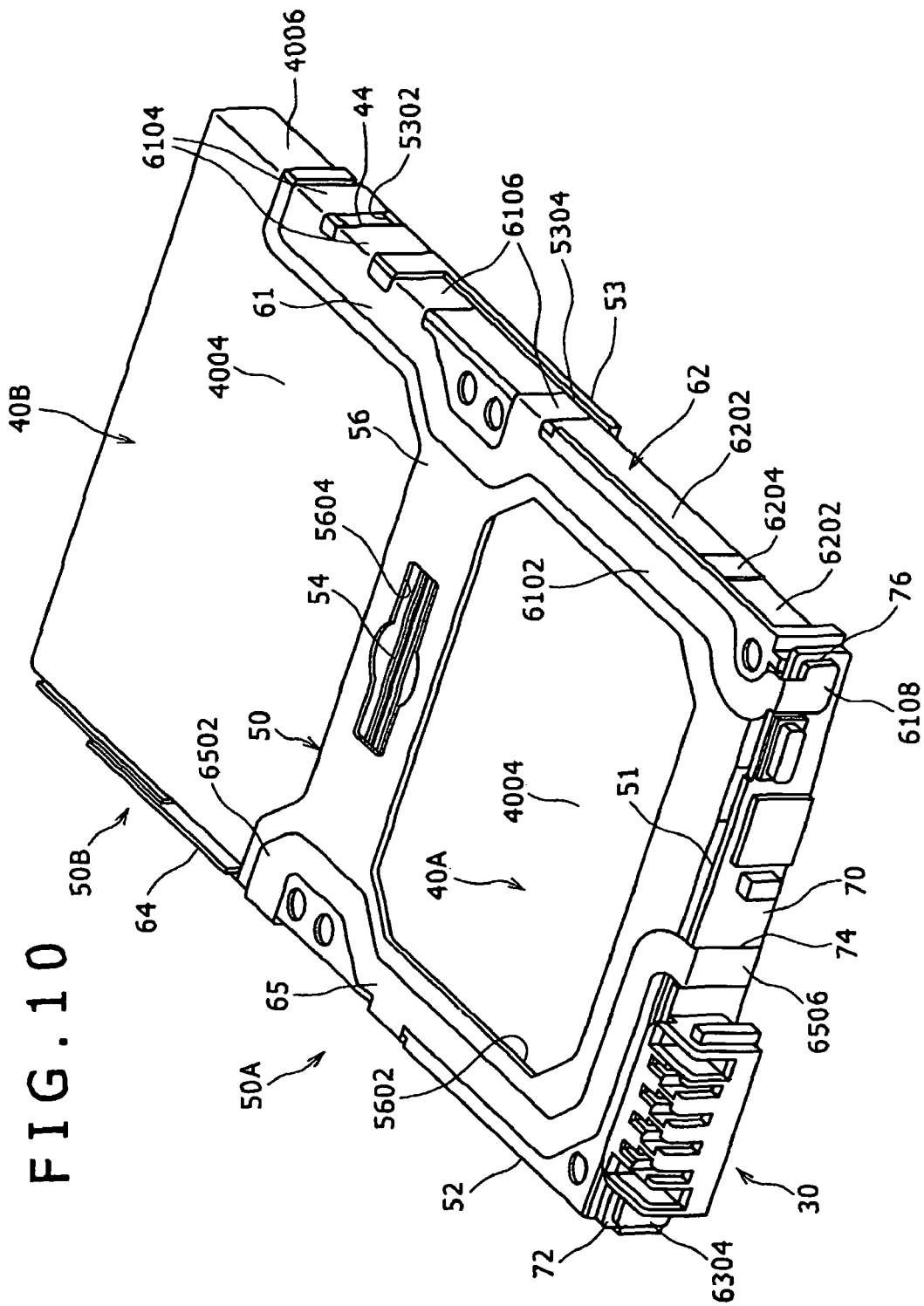
FIG. 10 is a perspective view of a battery cell section of the battery with a case removed.

Referring to FIGS. 4 and 9, the terminal forming member 36 is made of an insulating material such as a synthetic resin material and disposed in the open space 3206.

The terminal forming member 36 has a plurality of grooves 3602 formed in a spaced relationship from each other in the widthwise direction in such a manner as to be open in the lengthwise direction (forwardly) and extend in the thicknesswise direction. The grooves 3602 are formed such that they are open to the lower face 10D.

The contact section 33 is formed from a plurality of pairs of contact pieces 34 juxtaposed in a spaced relationship in the widthwise direction such that the contact pieces 34 in each pair are opposed to each other in the widthwise direction and are open forwardly and downwardly. In the present embodiment, the contact pieces 34 are disposed in a spaced relationship from each other in the widthwise direction between the pair of vertical walls 3202 such that they form side faces of the grooves 3602 opposing to each other in the widthwise direction.

In the present embodiment, a lower face 3022 of the connector 30 and the lower face 10D of the case 10 are positioned on the same plane.

Now, an internal structure of the battery 2 is described.

Figure 25A:
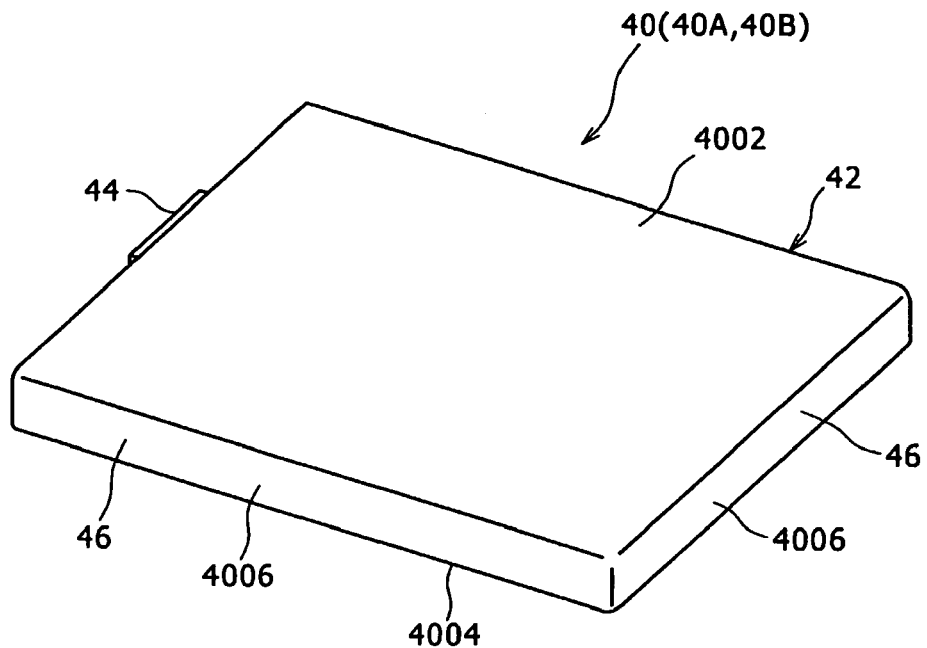
FIGS. 25A and 25B are perspective views of the battery cell.
Figure 25B:
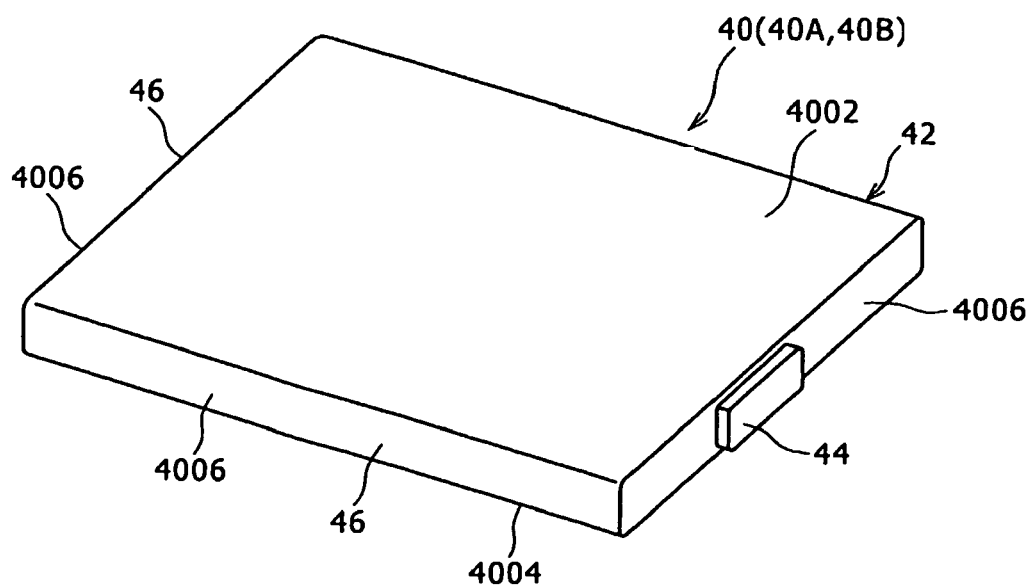

First, the battery cells 40 are described with reference to FIGS. 25A and 25B. Each of the battery cells 40 in the present embodiment is formed as a rechargeable battery cell such as a lithium ion cell or a nickel hydrogen cell.

The battery cell 40 has a sheath can 42 in the form of a flattened rectangular plate which in turn has an upper face 4002 and a lower face 4004 of a rectangular shape made of a conductive metal material and positioned at the opposite ends in the thicknesswise direction and four side faces 4006 interconnecting the upper face 4002 and the lower face 4004. In the present embodiment, the sheath can 42 is formed from a steel material on which nickel is plated.

A positive terminal 44 of the battery cell 40 is formed in a projecting manner on one of the four side faces 4006 such that it is isolated from the sheath can 42. More particularly, a swollen portion made of a nonconductive material and having a rectangular cross section is formed in a projecting manner on the side face 4006, and an end face of the swollen portion serves as the positive terminal 44. Further, a remaining location of the sheath can 42 other than the location at which the positive terminal 44 is provided is formed as a negative terminal 46 of the battery cell 40.

Referring to FIGS. 16 to 18 and 21, the holding member 50 includes a first battery accommodating section 50A and a second battery accommodating section 50B for accommodating the two battery cells 40 in a state that the battery cells 40 are juxtaposed in a rectangular shape in plan.

The holding member 50 is made of a nonconductive resilient material and has a first side piece 51, a second side piece 52, a third side piece 53, a fourth side piece 54, and edge pieces 56. The first side piece 51 is applied to the side faces 4006 of the sheath can 42 of the battery cell 40 accommodated in the first battery accommodating section 50A which corresponds to a minor side of the rectangular shape as viewed in plan. The second side piece 52 is applied to the side faces 4006 of the sheath can 42 of the battery cell 40 which correspond to one of the major sides of the rectangular shape as viewed in plan. The third side piece 53 is applied to the side faces 4006 of the sheath can 42 of the battery cell 40 which corresponds to the other major side of the rectangular shape in plan. The fourth side piece 54 is disposed between the opposing side faces 4006 of the sheath cans 42 of the two battery cells 40. The edge pieces 56 project from the edges of the four side pieces 51, 52, 53, and 54 and applied to locations of one of the upper face 4002 and the lower face 4004 (in the present embodiment, the lower face 4004) of the sheath cans 42 of the battery cells 40 displaced to the edges.

Figure 16:
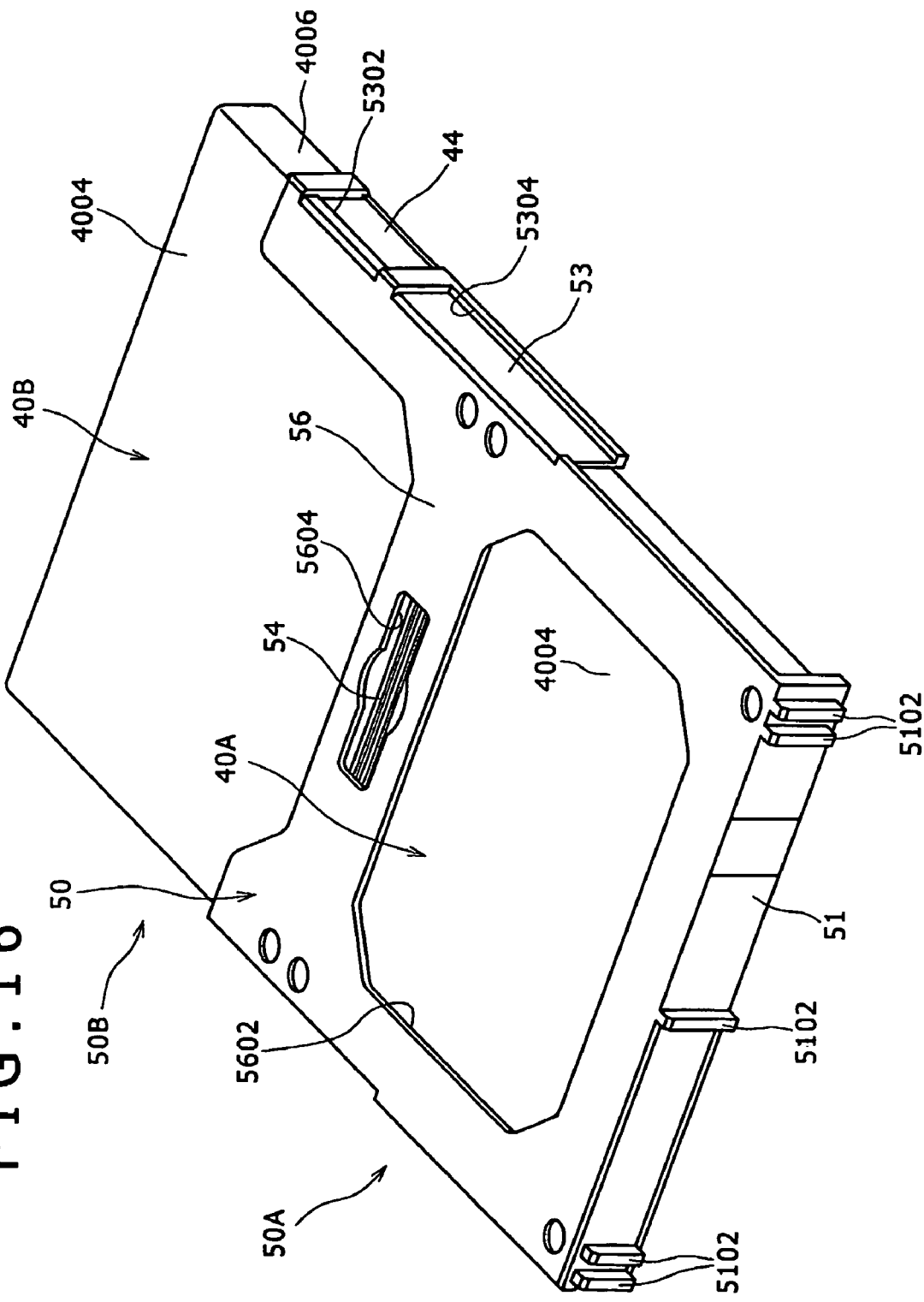
FIGS. 16 to 18 are perspective views as viewed in different directions showing a battery cell held by a holding member of the battery.
Figure 17:
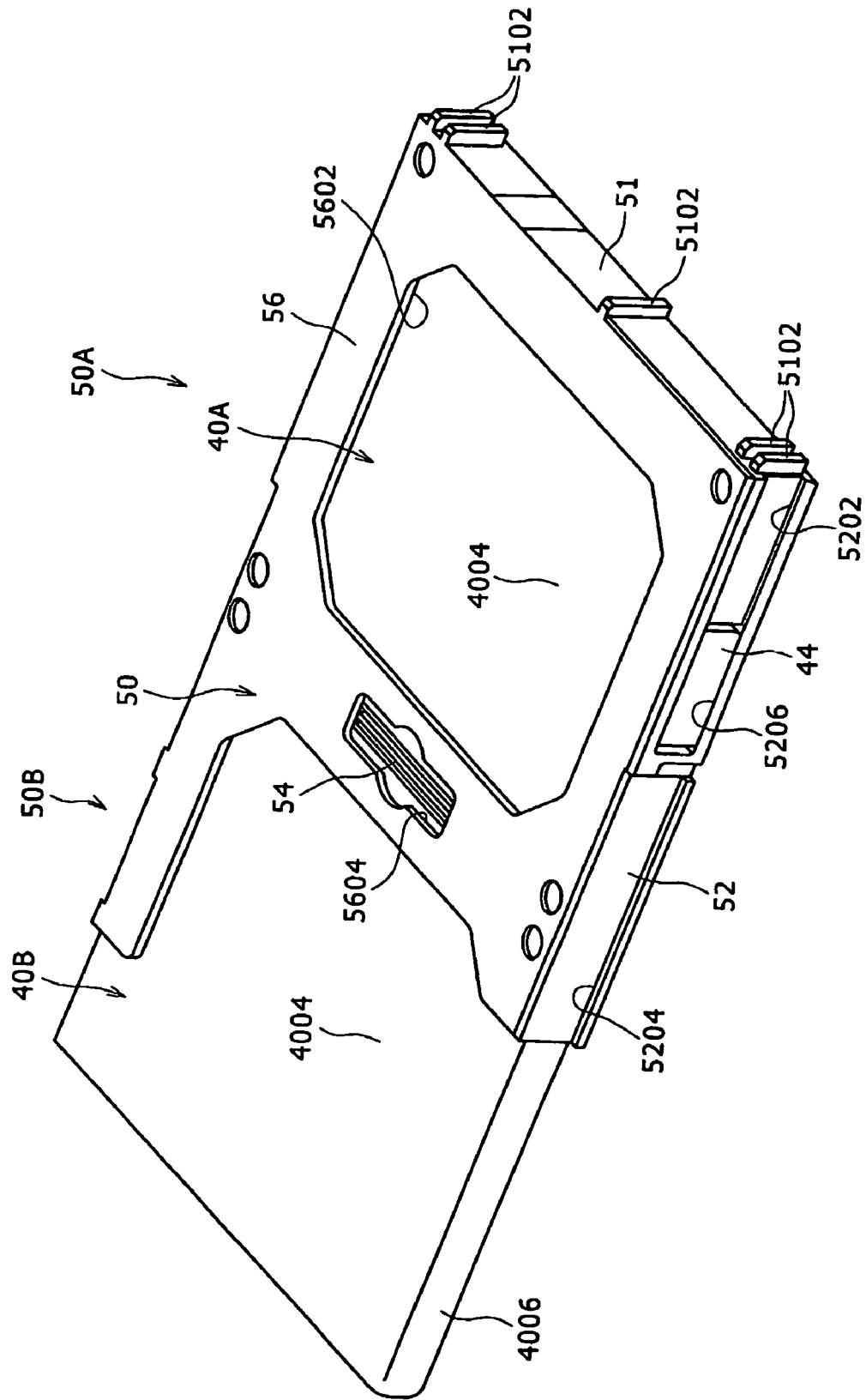

Referring to FIGS. 16 and 17, in the present embodiment, the two battery cells 40 are accommodated in the first and second battery accommodating chambers 50A and 50B such that the positive terminal 44 of the battery cell 40 accommodated in the first battery accommodating section 50A faces the second side piece 52 while the positive terminal 44 of the battery cell 40 accommodated in the second battery accommodating section 50B faces the third side piece 53.

It is to be noted that, for the convenience of description, the battery cell 40 accommodated in the first battery accommodating section 50A is hereinafter referred to as first battery cell 40A and the battery cell 40 accommodated in the second battery accommodating section 50B is hereinafter referred to as second battery cell 40B.

Referring to FIGS. 19 and 21, the first side piece 51 is formed such that it extends over the overall length of one of the side faces 4006 of the sheath can 42 of the first battery cell 40A.

Referring to FIGS. 16 and 19, ribs 5102 for attachment of the printed circuit board 70 are formed in a swollen manner on the surface of the first side piece 51. Thus, the printed circuit board 70 is attached to the first side piece 51 through the ribs 5102 such that it extends along the first side piece 51.

Figure 20A:
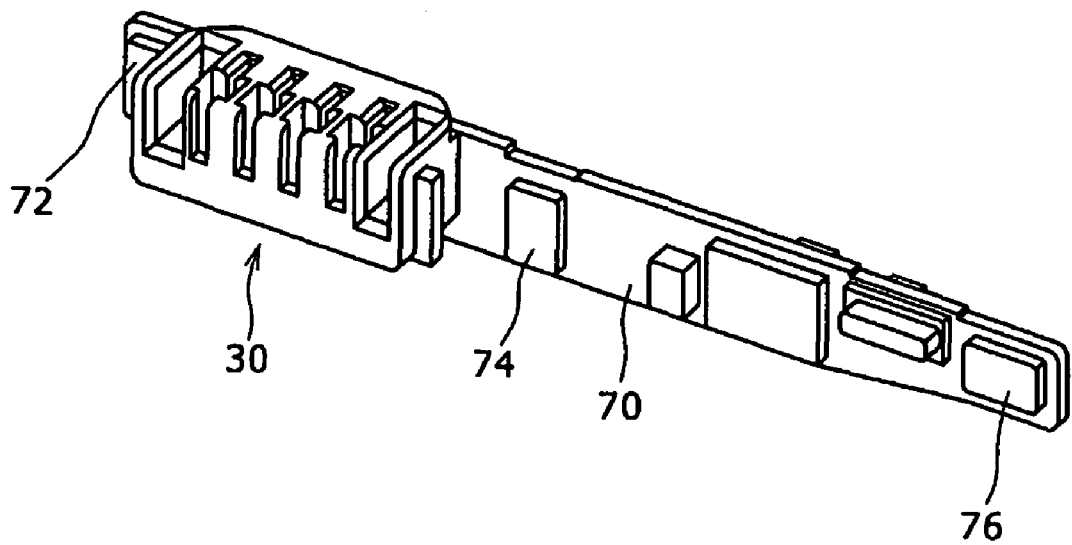
FIGS. 20A and 20B are perspective views of a printed circuit board of the battery as viewed in different directions.
Figure 20B:
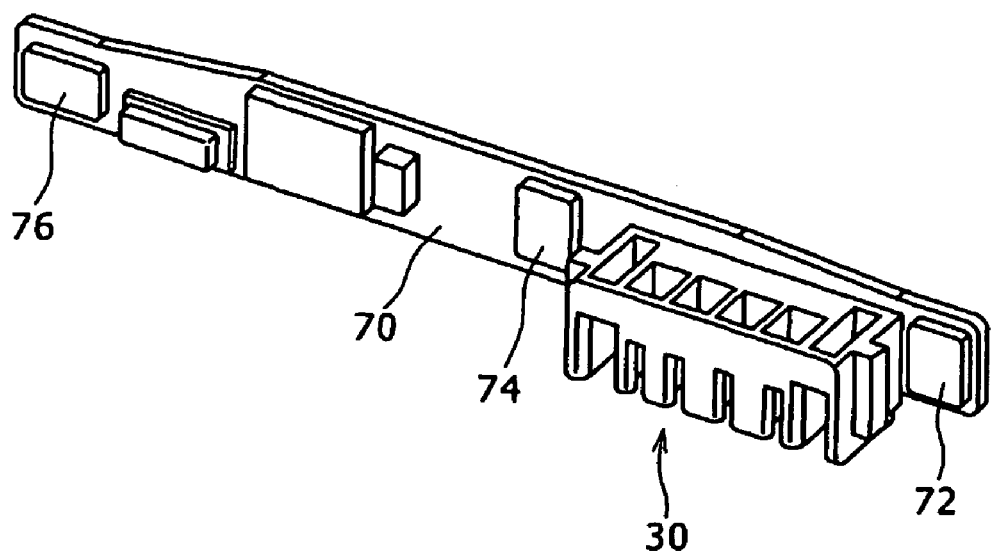
Figure 22:
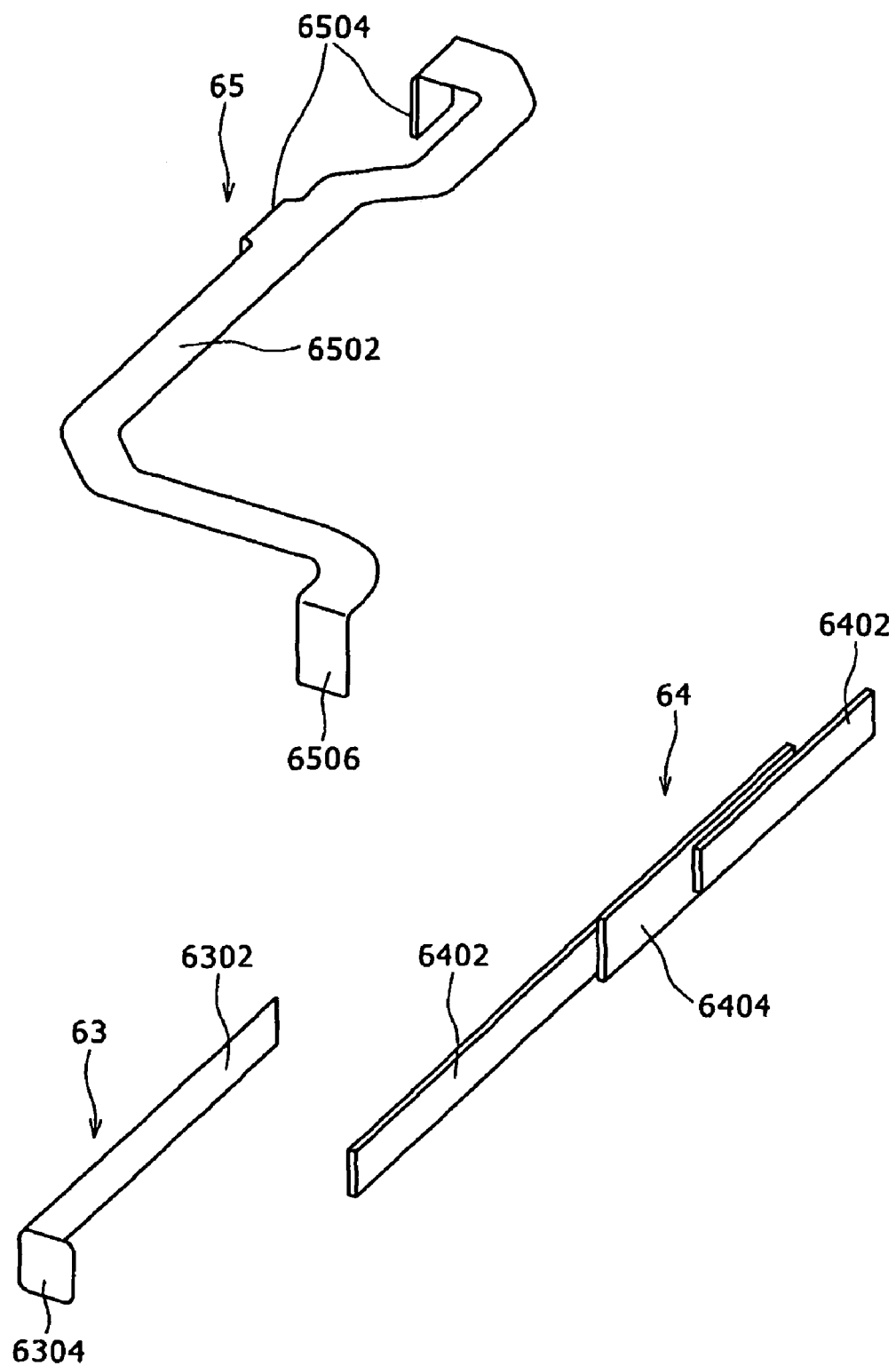
FIGS. 22 and 23 are perspective views of the conductive plate.
Figure 23:
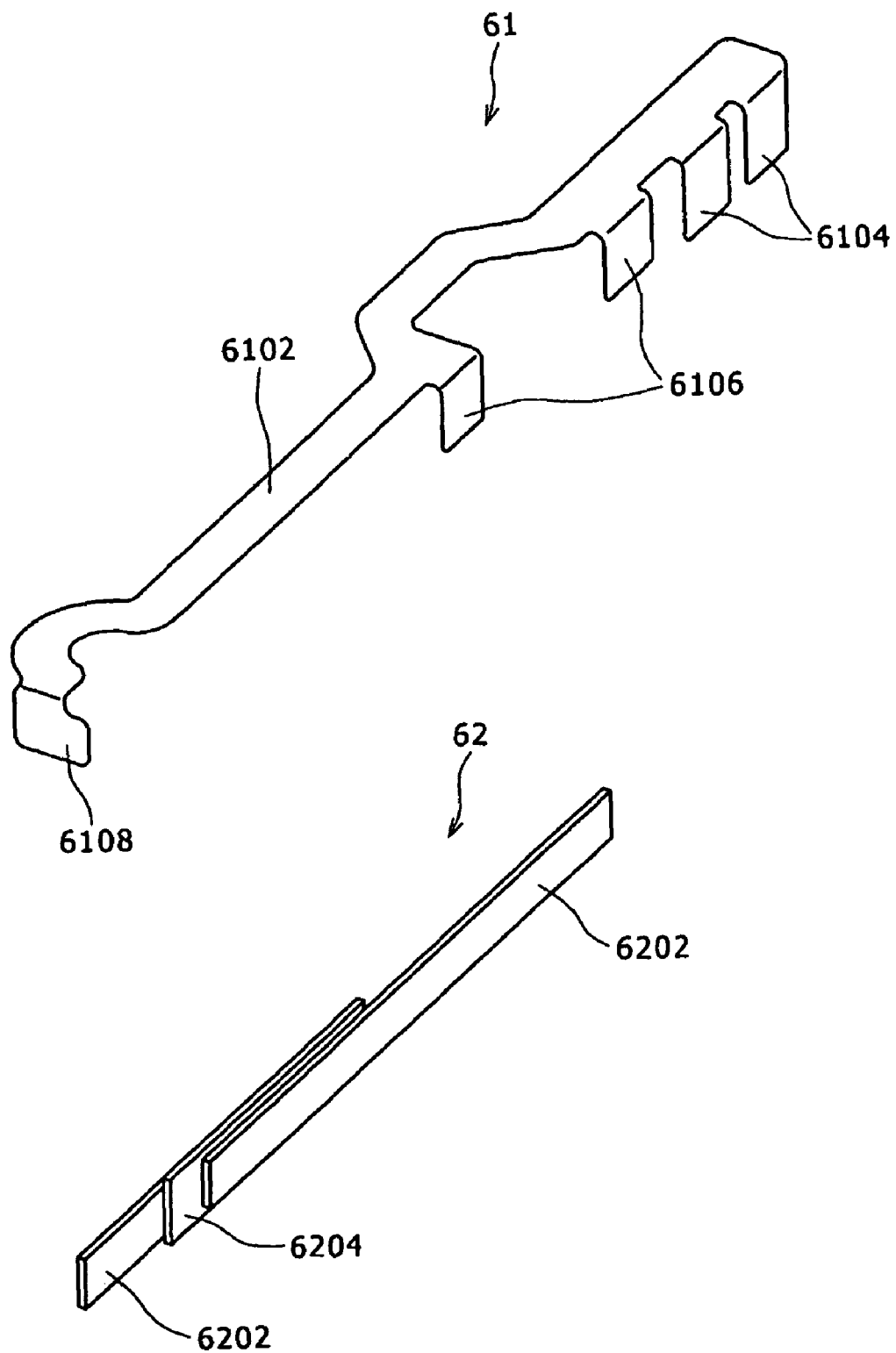
Figure 24:
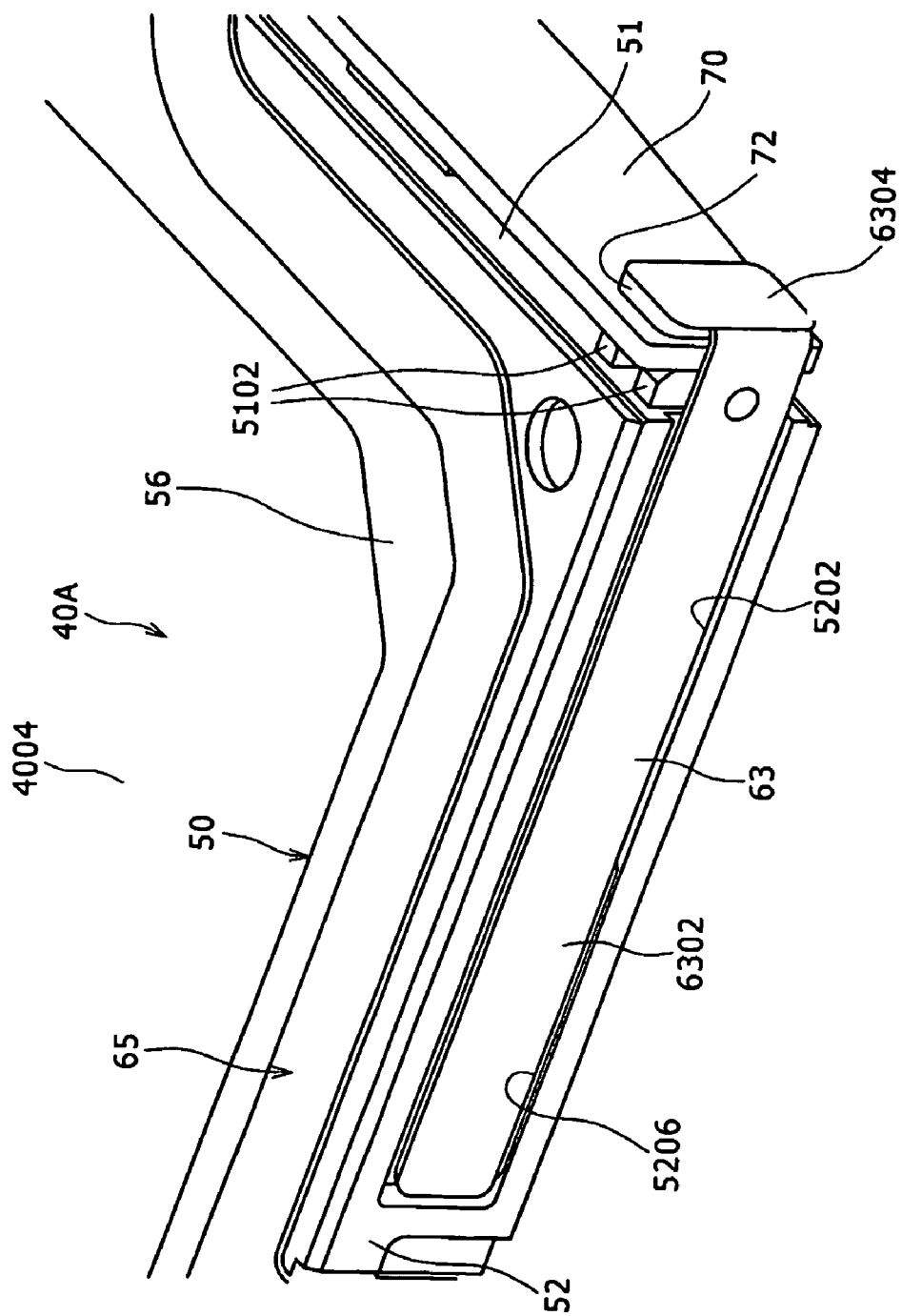
FIG. 24 is a perspective view of welded portions of the conductive plate of the battery cell.

Referring to FIGS. 19, 20A, and 20B, the connector 30 is mounted on the printed circuit board 70. The printed circuit board 70 has a conductive portion 72 for the positive pole, a conductive portion 74 for the negative pole, and a conductive portion 76 for a midpoint formed thereon for connecting to a contact piece 34 for the positive pole, a contact piece 34 for the negative pole, and a contact piece 34 for a midpoint of the connector 30, respectively.

LSIs and electronic parts, which form a control circuit, are mounted on the printed circuit board 70. The control circuit has functions of transmitting and receiving data of characteristics and identification information of the battery 2 to and from a control section of the electronic apparatus through the contact pieces 34 for data communication of the connector 30 and supervising output voltages, output current, and so forth of the battery cells 40 through the conductive portions 72, 74, and 76.

Referring to FIGS. 17 and 21, the second side piece 52 is connected at one end thereof to the first side piece 51 and formed such that it extends over the overall length of one of the side faces 4006 of the sheath can 42 of the first battery cell 40A and extends up to the side face 4006 of the second battery cell 40B rather near to the fourth side piece 54. The second side piece 52 is connected at a portion rather rear to an end thereof to an end portion of the fourth side piece 54.

A second engaging recess 5202 and a third engaging recess 5204 for engaging with the conductive plate 60 are formed in a spaced relationship in the extension direction of the second side piece 52 on the second side piece 52.

Further, an opening 5206 is formed in the second engaging recess 5202 rather near to the first side piece 51 such that the positive terminal 44 of the first battery cell 40A can project therethrough. It is to be noted that the third engaging recess 5204 is formed with a size with which the positive terminal 44 can be fitted into the opening 5206.

Referring to FIGS. 16 and 21, the third side piece 53 is formed separately from the first side piece 51 and extends along one of the side faces 4006 of the sheath can 42 of the first and second battery cells 40A and 40B. The third side piece 53 is connected at an intermediate portion thereof to an end portion of the fourth side piece 54.

It is to be noted that the second side piece 52 and the third side piece 53 are disposed in a spaced relationship from each other by a distance corresponding to the dimension between that one of the side faces 4006 which includes the positive terminals 44 of the battery cells 40 and that one of the side faces 4006 which opposes to the side face 4006. Consequently, when the battery cells 40 are inserted into the first and second battery accommodating chambers 50A and 50B, the second side piece 52 and the third side piece 53 are individually applied to the side faces 4006 of the sheath cans 42 of the battery cells 40.

An opening 5302 for allowing the positive terminal 44 of the second battery cell 40B to project therethrough is formed at a portion of the third side piece 53 spaced away from the fourth side piece 54. The opening 5302 is formed with a size which allows the positive terminal 44 to be fitted in the opening 5302.

Further, a first engaging recess 5304 for engaging with the conductive plate 60 is formed on the third side piece 53.

Figure 18:
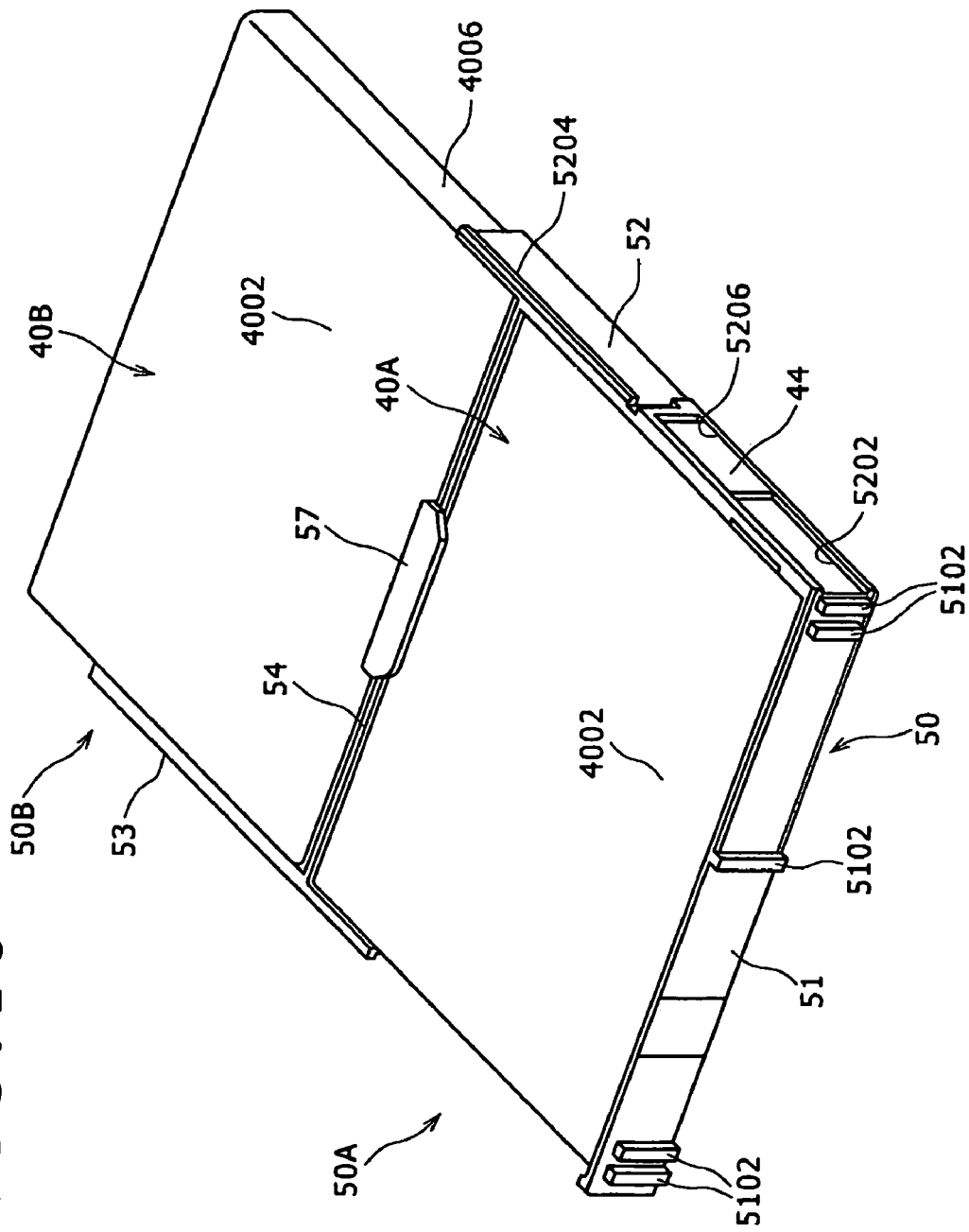

Referring to FIGS. 18 and 21, the fourth side piece 54 is configured so as to be applied to those two ones of the side faces 4006 of the battery cell 40 which do not include the positive terminal 44 together with the first side piece 51.

The fourth side piece 54 is formed to extend over the overall length of the battery cells 40 similarly to the first side piece 51.

Referring to FIGS. 16 and 19, the edge pieces 56 project from edges of the four side pieces 51, 52, 53, and 54 and have a width with which they are applied to locations rather near to edges of the lower face 4004 of the first and second battery cells 40A and 40B.

The edge piece 56 which projects from the edge of the fourth side piece 54 has an opening 5604 formed at an intermediate portion thereof in the extension direction.

Further, edge pieces 57 are formed at an intermediate portion of the fourth side piece 54 such that they are applied to edges of the upper face 4002 of the two battery cells 40 which are adjacent each other.

It is to be noted that the edge pieces 56 are formed in a rectangular framework shape such that they extend along the four sides of the lower face 4004 of the first battery cell 40A. Accordingly, the lower face 4004 is exposed at portions thereof except the four edge portions through an opening 5602 at the center of the four edge pieces 56. Further, the lower face 4004 of the second battery cell 40B is exposed at portions thereof other than the edge piece 56 of the third side piece 53 and the edge piece 56 of the fourth side piece 54.

In particular, where the first and second battery cells 40A and 40B are accommodated in the holding member 50, the upper face 4002 of the first and second battery cells 40A and 40B is open at all portions of the locations to which the edge pieces 57 are applied and the lower face 4004 has, although the edge pieces 56 exist, a cutaway portion formed among them for allowing a central portion to be exposed therethrough so that, when the battery cells 40 expand upon charging thereof, the expansion is permitted.

Further, the first and second battery cells 40A and 40B are inserted into and removed from the first and second battery accommodating chambers 50A and 50B through a portion of the holding member 50 at which the edge pieces 56 are not formed.

The conductive plate 60 includes a positive terminal connecting thin plate 60A for interconnecting the positive terminals 44 of the two battery cells 40 electrically connected in series to each other and the connector 30, and a negative terminal connecting thin plate 60B for interconnecting the negative terminals 46 of the two battery cells 40 electrically connected in series to each other and the connector 30.

The positive terminal connecting thin plate 60A and the negative terminal connecting thin plate 60B are both formed from a conductive material.

The positive terminal connecting thin plate 60A includes a first thin plate 61 and a second thin plate 62 disposed on the side on which the third side piece 53 is positioned, and a third thin plate 63 disposed on the side on which the second side piece 52 is positioned.

More particularly, the positive terminal connecting thin plate 60A includes a first thin plate 61 connected to the positive terminal 44 of the second battery cell 40B, a second thin plate 62 attached to the first thin plate 61 and connected to the negative terminal 46 of the first battery cell 40A, and a third thin plate 63 joined to the positive terminal 44 of the first battery cell 40A and connected to the conductive portion 72 of the printed circuit board 70.

The first thin plate 61 has an extension 6102 passing above the edge piece 56 connecting to the fourth side piece 54 and extending above the edge piece 56 connected to the third side piece 53, and two positive terminal joining bent lugs 6104 extending perpendicularly from one end of the extension 6102 for being joined to the positive terminal 44 of the second battery cell 40B. The first thin plate 61 further has two thin plate joining bent lugs 6106 extending perpendicularly from an intermediate portion of the extension 6102 above the second thin plate 62, and a conductive portion joining bent lag 6108 extending perpendicularly from the other end of the extension 6102 and connected to the conductive portion 76 for a midpoint of the printed circuit board 70.

One of the two positive terminal joining bent lugs 6104 of the first thin plate 61 is joined to the positive terminal 44 of the second battery cell 40B by welding.

The reason why two such positive terminal joining bent lugs 6104 and two such thin plate joining bent lugs 6106 are provided is that it is possible to set only one of the bent portions and cut away the one bent portion upon exchange of the battery cell 40 such that the remaining bent portion can be used.

The conductive portion joining bent lag 6108 of the first thin plate 61 is joined to the conductive portion 76 for a midpoint of the printed circuit board 70 by welding. Consequently, in the present embodiment, it is possible to utilize part of the positive terminal connecting thin plate 60A to supply the potential at the joining location of the positive terminal 44 and the negative terminal 46 of each of the two battery cells 40 connected to each other to the conductive portion 76 of the printed circuit board 70 such that output voltages or output current of the two battery cells 40 is supervised by the control circuit of the printed circuit board 70.

The second thin plate 62 is disposed such that a portion thereof extends over the overall length on the side face 4006 of the first battery cell 40A at a location at which the third side piece 53 does not exist while the remaining portion extends on the third side piece 53 and is engaged with the first engaging recess 5304 of the third side piece 53.

The second thin plate 62 includes two thin plates 6202 made of a metal material and a thermistor 6204 interposed between the thin plates 6202. In the present embodiment, the thermistor 6204 is formed from a PTC (Positive Temperature Coefficient) thermistor. The PTC thermistor has a resistance value which exhibits such a positive characteristic that it increases as the temperature rises. Thus, the PTC thermistor has a resistance value of a positive characteristic that it increases suddenly as excessive current flows therethrough to suppress the current to flow thereby to protect the electronic apparatus in which the battery cells 40 and the battery 2 is incorporated.

A portion of an increased thickness formed by one of the thin plates 6202 and the thermistor 6204 made of metal placed one on the other extends on the side face 4006 of the first battery cell 40A at which the third side piece 53 does not exist, and an end portion of the second thin plate 62 positioned near to the first side piece 51 is joined to the side face 4006 of the first battery cell 40A by welding, that is, joined to the negative terminal 46 of the first battery cell 40A.

Further, a portion of the second thin plate 62 which extends along the first engaging recess 5304 of the third side piece 53 is formed only from the single thin plate 6202 and is engaged with the first engaging recess 5304.

The two thin plate joining bent lugs 6106 described above are placed on the portion of the second thin plate 62 engaged with the first engaging recess 5304, and one of the thin plate joining bent lugs 6106 is joined to the second thin plate 62 by welding.

In the present embodiment, in the state that the second tin plate 62 is engaged with the first engaging recess 5304, the first thin plate 61 and the second thin plate 62 which form the positive terminal connecting thin plate 60A are positioned in the direction perpendicular to that one of the side faces 4006 of the sheath can 42 to which the third side piece 53 is applied. Consequently, assembly of the first thin plate 61 and the second thin plate 62 can be performed simply.

Further, in the present embodiment, in the state that the second thin plate 62 is engaged with the first engaging recess 5304 and the two thin plate joining bent lugs 6106 are placed on the second thin plate 62, the surface of the thin plate joining bent lugs 6106 is positioned in flush with the surface of the third side piece 53 at any other portion than the portion at which the first engaging recess 5304 is formed or at a location lower than the surface of the third side piece 53. Consequently, the unit of the battery cells 40 held by the holding member 50 and having the conductive plate 60 assembled thereto can be miniaturized.

Figure 11:
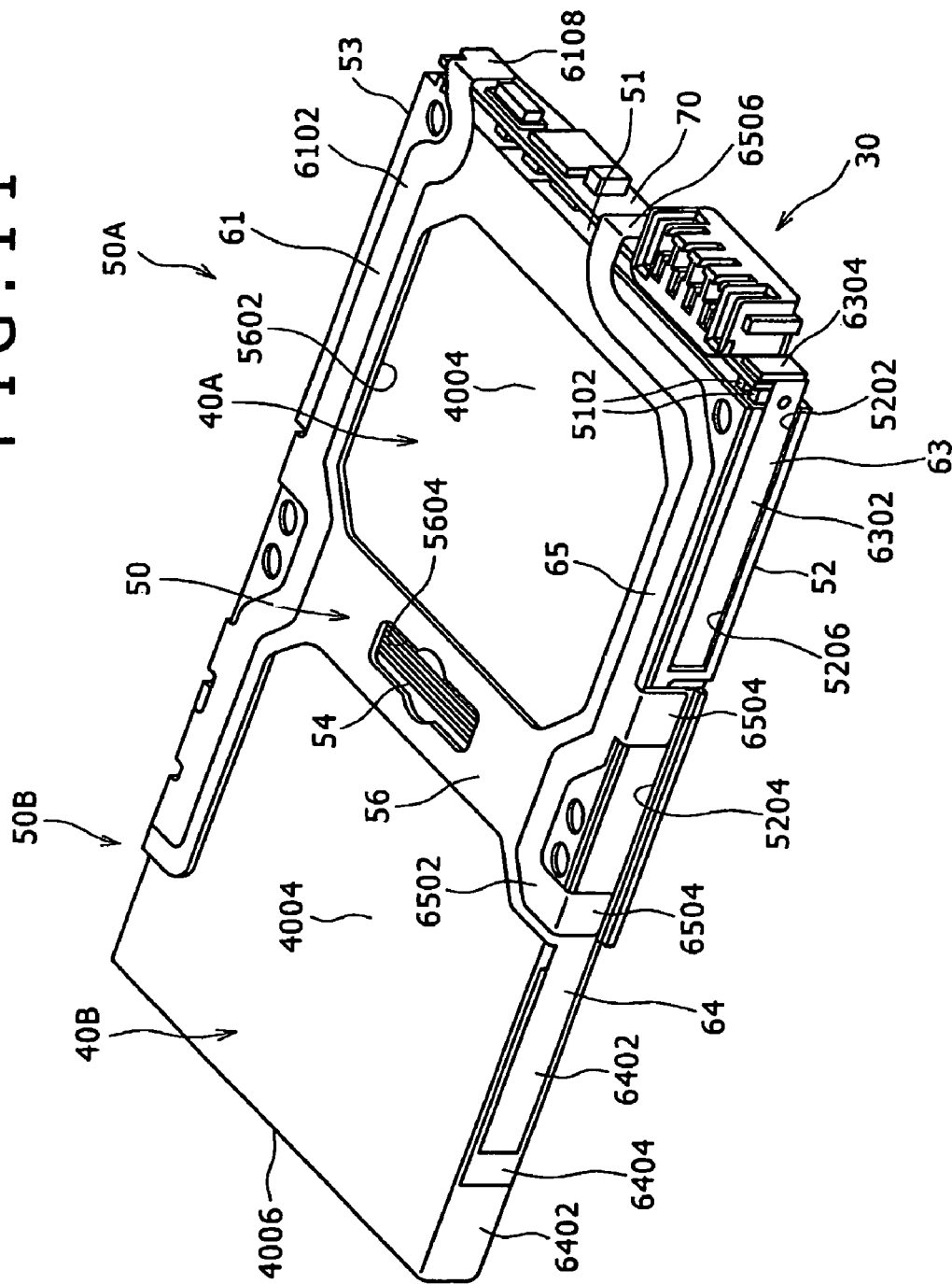
FIG. 11 is a perspective view of the battery cell section of the battery with the case removed but as viewed in a different direction from that of FIG. 10.
Figure 12:
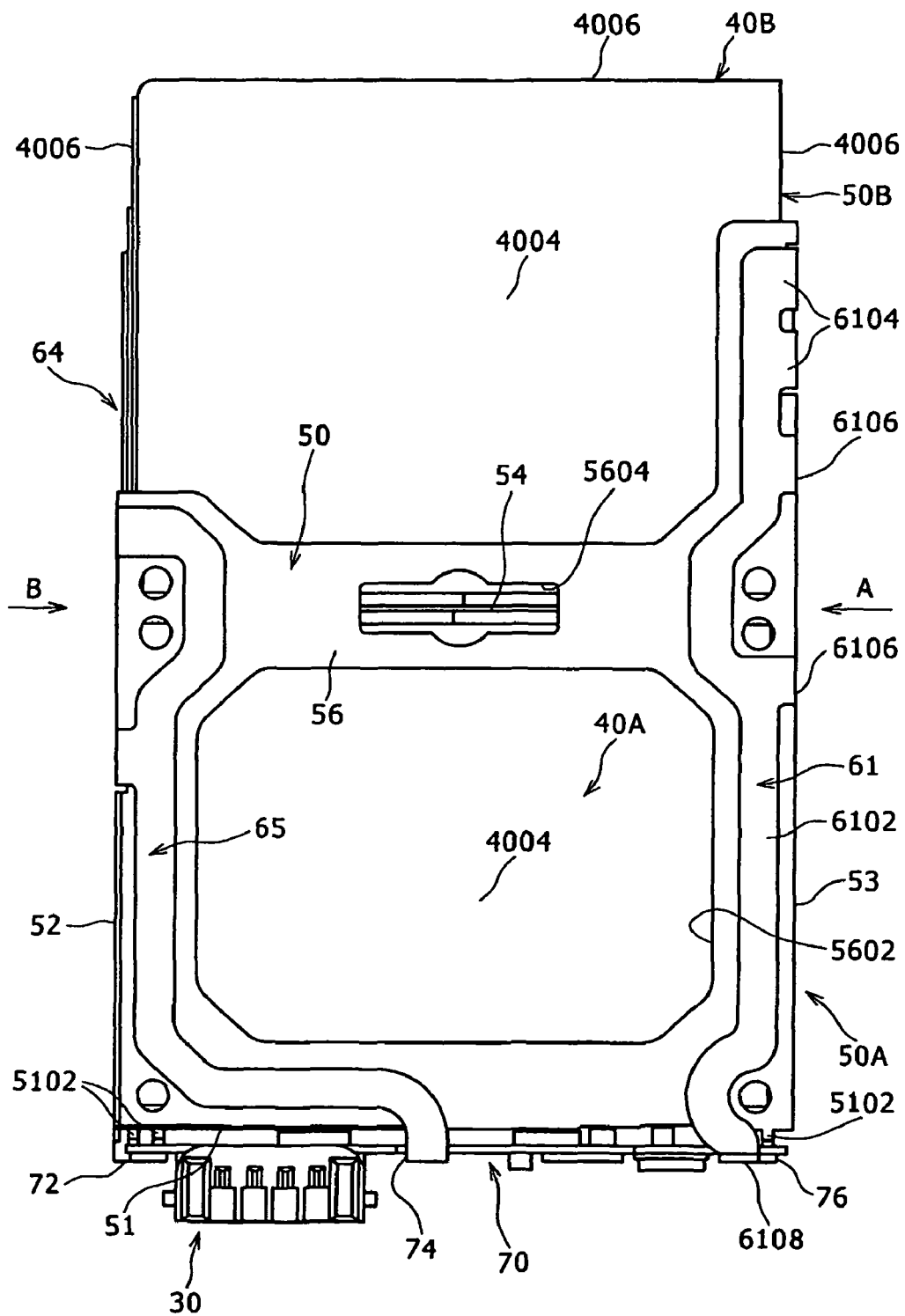
FIG. 12 is a bottom plan view of the battery cell section of the battery with the case removed.
Figure 13:
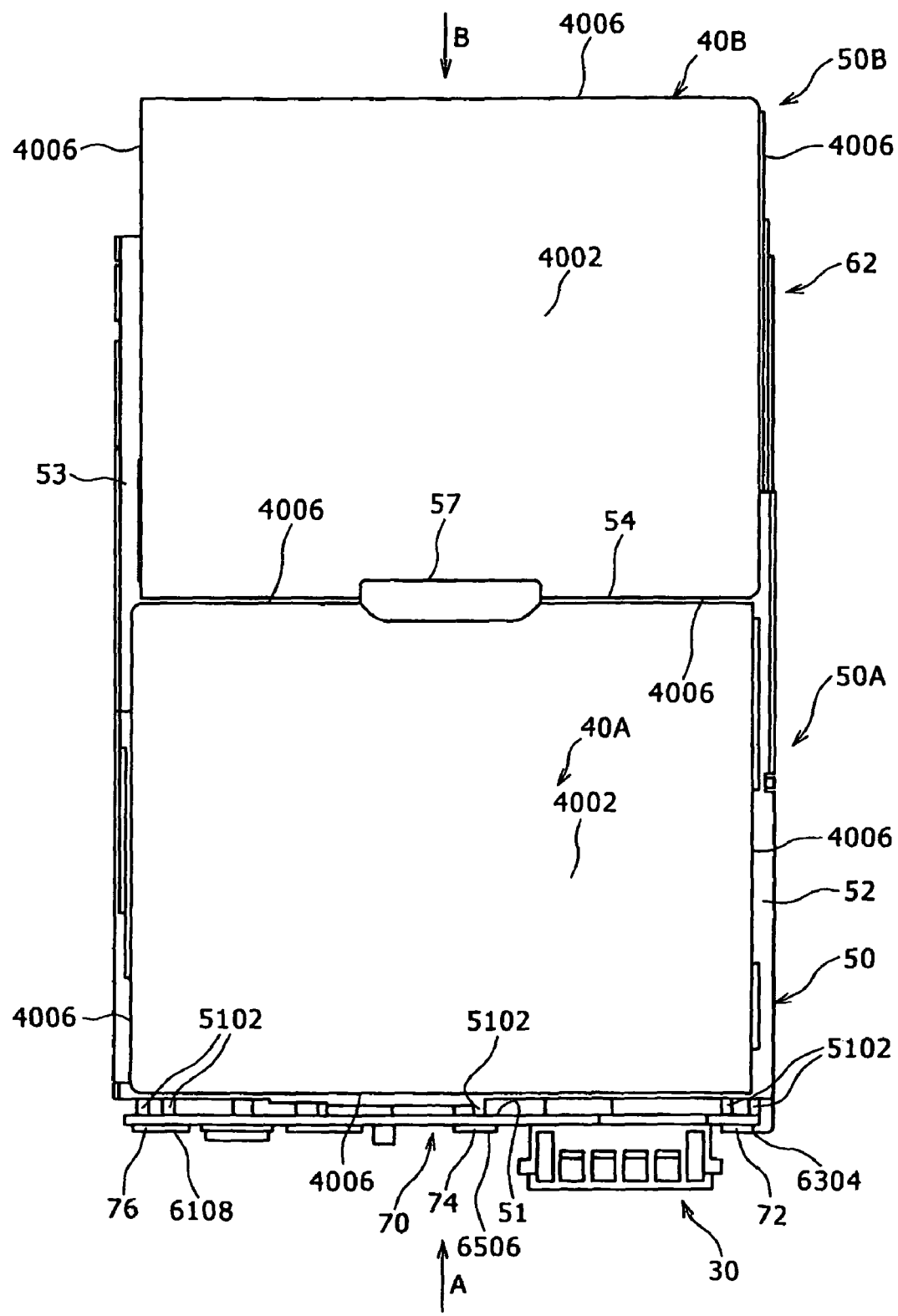
FIG. 13 is a top plan view of the battery cell section of the battery with the case removed.
Figure 15A:
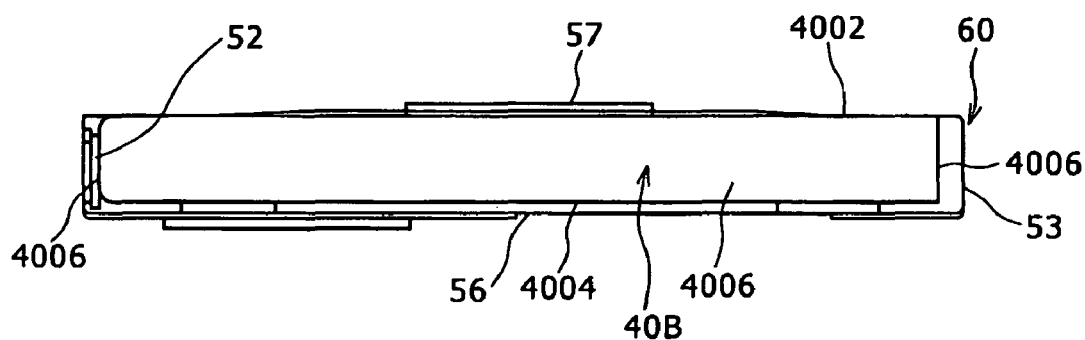
FIG. 15A is a view as viewed in the direction indicated by an arrow mark A in FIG. 13.
Figure 15B:
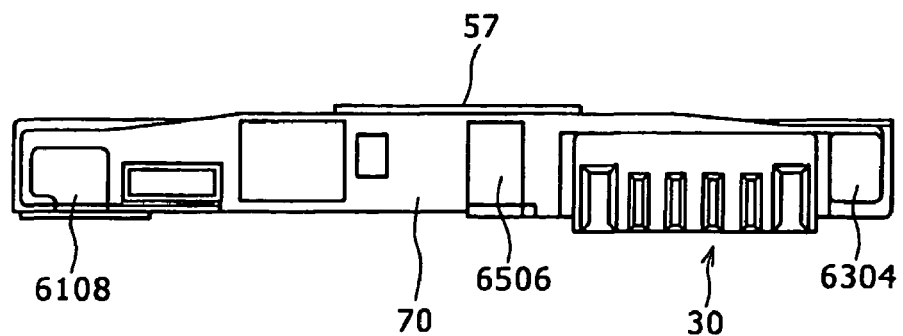
FIG. 15B is a view as viewed in the direction indicated by an arrow mark B in FIG. 13.

Referring to FIG. 11, the third thin plate 63 has an extension 6302 extending over the overall length on the second engaging recess 5202 of the second side piece 52 and disposed so as to cover the opening 5206, and a conductive portion joining bent lug 6304 extending perpendicularly from one end of the extension 6302 and connected to the conductive portion 72 for the positive pole of the printed circuit board 70.

Above the second engaging recess 5202, the extension 6302 is joined at a location thereof rather near to an end portion in the extension direction to a location of the positive terminal 44 of the first battery cell 40A rather near to an end portion (location rather near to an end portion of the positive terminal 44 on the side spaced from the first side piece 51). The reason why the extension 6302 is jointed to the location rather near to the end portion of the positive terminal 44 is that, when any of the battery cells 40 is exchanged, the joined portion can be cut such that a new end portion of the extension 6302 can be joined to a location of the positive terminal 44 rather near to the other end portion.

In the present embodiment, in the state that the third thin plate 63 is engaged with the second engaging recess 5202, the third thin plate 63 is positioned in the direction perpendicular to the side face 4006 of the sheath can 42 to which the second side piece 52 is applied.

Further, in the present embodiment, in the state that the third thin plate 63 is engaged with the second engaging recess 5202, the surface of the third thin plate 63 is positioned on the same plane as the surface of the second side piece 52 other than the location at which the second engaging recess 5202 is formed or is positioned at a location lower than the surface of the second side piece 52.

The conductive portion joining bent lug 6304 is joined to the conductive portion 72 for the positive pole of the printed circuit board 70 by welding.

Consequently, the positive terminal 44 of the second battery cell 40B, negative terminal 46 of the first battery cell 40A, positive terminal 44 of the first battery cell 40A, and connector 30 are connected to each other by the positive terminal connecting thin plate 60A.

Referring to FIGS. 11 and 19, the negative terminal connecting thin plate 60B includes a fourth thin plate 64 and a fifth thin plate 65 disposed on the side on which the second side piece 52 is positioned.

More particularly, the negative terminal connecting thin plate 60B includes a fourth thin plate 64 connected to the negative terminal 46 of the second battery cell 40B, and a fifth thin plate 65 attached to the fourth thin plate 64 and connected to the conductive portion 74 of the printed circuit board 70.

The fourth thin plate 64 extends at a portion thereof over the overall length on the side face 4006 of the second battery cell 40B. The remaining portion of the fourth thin plate 64 is extended over the second side piece 52 and is in engagement with the third engaging recess 5204 of the second side piece 52.

The fourth thin plate 64 includes, similarly to the second thin plate 62, two thin plates 6402 made of a metal material, and a thermistor 6404 interposed between the thin plates 6402. In the present embodiment, the thermistor 6404 is formed from a PTC thermistor similarly to the thermistor 6204 described hereinabove.

A portion of an increased thickness formed by the thin plate 6402 and the thermistor 6404 of metal placed one on the other extends on the side face 4006 of the second battery cell 40B at which the second side piece 52 does not exist, and an end portion of the fourth thin plate 64 positioned remotely from the first side piece 51 is joined to the side face 4006 of the second battery cell 40B by welding, that is, joined to the negative terminal 46 of the second battery cell 40B.

Further, a portion of the fourth thin plate 64 which extends along the third engaging recess 5204 of the second side piece 52 is formed only from the single thin plate 6402 and is engaged with the third engaging recess 5204.

The fifth thin plate 65 includes an extension 6502 passing above the edge piece 56 connecting to the fourth side piece 54 and extending on the edge piece 56 connected to the second side piece 52, two thin plate joining bent lugs 6504 extending perpendicularly from one end of the extension 6502 and capable of being joined to the fourth side piece 54, and a conductive portion joining bent lug 6506 extending perpendicularly from the other end of the extension 6502 and connected to the conductive portion 74 of the printed circuit board 70.

One of the two thin plate joining bent lugs 6504 of the fifth thin plate 65 is joined to a portion of the fourth thin plate 64 which is positioned above the third engaging recess 5204 by welding.

The reason why two such thin plate joining bent lugs 6504 are provided is that it is possible to use only one of the bent portions and cut away the one bent portion upon exchange of the battery cells 40 such that the remaining bent portion can be used.

The conductive portion joining bent lug 6506 of the fifth thin plate 65 is joined to the conductive portion 74 of the printed circuit board 70 by welding.

In the present embodiment, in the state that the fourth thin plate 64 is engaged with the third engaging recess 5204, the fourth thin plate 64 and the fifth thin plate 65 which form the negative terminal connecting thin plate 60B are positioned in the direction perpendicular to the side face 4006 of the sheath can 42 to which the second side piece 52 is applied. Consequently, assembly of the fourth thin plate 64 and the fifth thin plate 65 can be performed simply.

Further, in the present embodiment, in the state that the fourth thin plate 64 is engaged with the third engaging recess 5204 and the two thin plate joining bent lugs 6504 are placed on the fourth thin plate 64, the surface of the thin plate joining bent lugs 6504 is positioned on the same plane as the surface of the second side piece 52 other than the location at which the third engaging recess 5204 is formed or is positioned at a location lower than the surface of the second side piece 52. Consequently, the unit of the battery cells 40 held by the holding member 50 and having the conductive plate 60 assembled thereto is miniaturized.

According to the battery 2 of the present embodiment, the battery cells 40 are held by the holding member 50 while they are isolated from each other, and the conductive plate 60 is disposed along the holding member 50 by the holding member 50 while it is isolated from the battery cell 40. Therefore, when compared with an alternative case that insulating paper or a double-sided adhesive tape is used to assure isolation between the battery cells, fixation of the battery cells to each other, and isolation between the battery cells and the conductive plate as in the case of the battery in related art described hereinabove, miniaturization of the battery 2 can be anticipated, the number of parts can be reduced significantly, and assembly can be simplified. Consequently, the cost can be reduced.

Further, upon assembly of the battery 2, the first to third engaging recesses 5304, 5202, and 5204 can be utilized to dispose the conductive plate 60 simply while the conductive plate 60 is positioned on the holding member 50. Accordingly, if, in the state that the battery cell 40 is held by the holding member 50, the printed circuit board 70 is positioned and disposed at a front portion of the first side piece 51, for example, using a jig or the like, then the conductive plate 60 is positioned and disposed on the holding member 50 making use of the first to third engaging recesses 5304, 5202, and 5204. Accordingly, welding can be performed simply in the state that the printed circuit board 70 and the conductive plate 60 are positioned, which is advantageous for simplification of assembly.

Further, since each of the battery cells 40 in the first and second battery accommodating chambers 50A and 50B is open except peripheral portions of the upper face 4002 and the lower face 4004, even if the central portions of the upper face 4002 and the lower face 4004 are swollen to increase the thickness upon charging of the battery cells 40 or the like, the thickness increase can be absorbed. Further, since the holding member 50 does not exist at central portions of the swollen upper face 4002 and lower face 4004, the gaps 1212 and 1213 between the inner face of the case 10 and the battery cells 40 can be utilized effectively. This is advantageous when it is tried to prevent the case 10 of the battery 2 from being swollen in the thicknesswise direction.

Further, the positive terminal connecting thin plate 60A, which interconnects the positive terminal 44 of the second battery cell 40B and the negative terminal 46 of the first battery cell 40A, is formed including the first thin plate 61, which passes a location of the edge pieces 56 connecting to the fourth side piece 54. The negative terminal connecting thin plate 60B, which interconnects the negative terminal 46 of the second battery cell 40B and the conductive portion 74 of the printed circuit board 70, is formed including the first thin plate 61 and the fifth thin plate 65, which pass a location of the edge pieces 56 to which the fourth side piece 54 is connected. Even if, for example, the battery 2 is placed into a pocket and deformed in the thicknesswise direction, the external force, which is applied to the joining portion of the positive terminal connecting thin plate 60A and the negative terminal connecting thin plate 60B, can be reduced, which is advantageous when it is tried to prevent failure in connection.

It is to be noted that, while, in the embodiment described above, the battery accommodates two battery cells 40 therein, the present invention can naturally be applied also to a battery accommodating a single battery cell. In this instance, the battery is configured in the following manner.

The battery includes a case in which a battery cell in the form of a flattened rectangular plate is accommodated, a connector exposed from the case, a holding member for holding the battery cell in the case, and a conductive plate for connecting the positive terminal and the negative terminal of the battery cell to the connector.

The battery cell includes a sheath can in the form of a flattened rectangular plate made of a conductive metal material and having rectangular upper and lower faces positioned at the opposite ends in a thicknesswise direction and four side faces for connecting the upper and lower faces to each other.

The positive terminal of the battery cell is formed on one of the four side faces in an isolated condition from the sheath can while the remaining location of the sheath can other than the location at which the positive terminal is provided is formed as the negative terminal of the battery cell.

The holding member has a battery accommodating section in which the battery cell is accommodated.

The holding member is made of a nonconductive resilient material and includes first to third side pieces for being applied to at least three ones of the side faces of the sheath can of the battery cell accommodated in the battery accommodating section, and an edge piece projecting from an edge of each of the first to third side pieces for being applied to a location rather near to an edge of one of the upper and lower faces of the sheath can of the battery cell.

The conductive plate includes a conductive and resilient positive terminal connecting thin plate extending on the holding member for interconnecting the positive terminal of the battery cell accommodated in the battery accommodating section and the connector, and a conductive and resilient negative terminal connecting thin plate extending on the holding member for interconnecting the negative terminal of the battery cell and the connector.

The positive terminal connecting thin plate is joined to the positive terminal and the connector by welding, and the negative terminal connecting thin plate is joined to the negative terminal and the connector by welding.

Further, the components of the embodiment described above such as the first to third engaging recesses 5304, 5202, and 5204 and the first to fifth thin plates 61 to 65 may be adopted suitably.

Further, while, in the embodiment described above, two battery cells are electrically connected in series to each other, the present invention can naturally be applied also to a different case that two battery cells are electrically connected in parallel to each other.

While a preferred embodiment of the present invention has been described using specific terms, such description is for illustrative purpose only, and it is to be understood that changes and variations may be made without departing from the spirit or scope of the following claims.

The invention claimed is:

1. A battery comprising:
a case in which two battery cells each in the form of a flattened rectangular plate are accommodated;
a connector exposed from said case;
a holding member for holding said two battery cells in said case;
said holding member comprising a nonconductive resilient material;
said holding member including a first battery accommodating section and a second battery accommodating section in which said battery cells each in the form of a flattened rectangular plate are accommodated in a juxtaposed relationship so as to form a rectangular shape as viewed in plan, the holding member further including side pieces corresponding to the two major sides of the rectangular shape as viewed in plan for being applied to the corresponding side faces of said sheath cans of said battery cells accommodated in said first and second battery accommodating sections; and
a resilient conductive plate extending on said holding member and electrically connecting said two battery cells accommodated in said first and second battery accommodating sections and said connector to each other,
at least one of the side pieces including an engaging recess with a surface depressed relative to another surface of the side piece in which the recess is disposed, the conductive plate being disposed in the engaging recess.

2. The battery according to claim 1, wherein
said conductive plate includes:
a pair of positive terminal connecting thin plates for interconnecting a positive terminal of one of said two battery cells accommodated in said first and second battery accommodating sections and a negative terminal of the other of said two battery cells and interconnecting a positive terminal of said the other one of said battery cells and said connector; and
a negative terminal connecting thin plate for interconnecting a negative terminal of the one of said battery cells and said connector.

3. The battery according to claim 2, wherein
said positive terminal connecting thin plates are joined to the positive terminals, the negative terminal, and said connector by welding, and
said negative terminal connecting thin plate is joined to the negative terminal and said connector by welding.

4. A battery comprising:
a case in which two battery cells each in the form of a flattened rectangular plate are accommodated;
a connector exposed from said case;
a holding member for holding said two battery cells in said case;
said holding member comprising a nonconductive resilient material;
said holding member including a first battery accommodating section and a second battery accommodating section in which said battery cells each in the form of a flattened rectangular plate are accommodated in a juxtaposed relationship so as to form a rectangular shape as viewed in plan; and
a resilient conductive plate extending on said holding member and electrically connecting said two battery cells accommodated in said first and second battery accommodating sections and said connector to each other, wherein
each of said battery cells includes a sheath can in the form of a flattened rectangular plate comprising a conductive metal material and including rectangular upper and lower faces positioned at the opposite ends in a thicknesswise direction and four side faces connecting said upper and lower faces to each other, and
said holding member includes a first side piece corresponding to one of the minor sides of the rectangular shape as viewed in plan to be applied to one of said side faces of said sheath can of the battery cell accommodated in said first battery accommodating section, second and third side pieces corresponding to the two major sides of the rectangular shape as viewed in plan to be applied to the corresponding side faces of said sheath cans of said battery cells accommodated in said first and second battery accommodating sections, a fourth side piece disposed between the opposing side faces of said sheath cans of said battery cells accommodated in said first and second battery accommodating sections, and an edge piece projecting from an edge of each of said first to fourth side pieces to be applied to a location near to an edge of one of said upper and lower faces of said sheath can of each of said battery cells accommodated in said first and second battery accommodating sections.

5. The battery according to claim 4, wherein
said battery cells accommodated in said first and second battery accommodating sections are juxtaposed such that the positive terminal of one of said battery cells faces said second side piece while the positive terminal of the other of said battery cells faces said third side piece, and
each of said second and third side pieces includes an opening that receives the respective positive terminal.

6. The battery according to claim 4, further comprising a printed circuit board attached to said first side piece so as to extend along said first side piece and with said connector attached to the printed circuit board, an end portion of a positive terminal connecting thin plate and an end portion of a negative terminal connecting thin plate being joined to conductive portions electrically connecting to said connector.

7. The battery according to claim 2, wherein
said positive terminal connecting thin plate is disposed in such a manner as to pass above said holding member, interconnect the positive terminal of the battery cell accommodated in said second battery accommodating section and the negative terminal of the battery cell accommodated in said first battery accommodating section, and further interconnect the positive terminal of the battery cell accommodated in said first battery cell accommodating section and said connector.

8. The battery according to claim 7, wherein
said positive terminal connecting thin plate includes:
a thin plate passing above said holding member to interconnect the positive terminal of the battery cell accommodated in said second battery cell accommodating section and the negative terminal of the battery cell accommodated in said first battery accommodating section; and
an other thin plate interconnecting the positive terminal of the battery cell accommodated in said first battery accommodating section and said connector.

9. The battery according to claim 1, wherein
said conductive plate is partly engaged with said engaging recess and disposed on said holding member.

10. The battery according to claim 4, wherein
a positive terminal connecting thin plate and a negative terminal connecting thin plate are disposed so as to pass above part of said second or third side piece,
each of said second and third side pieces includes an engaging recess that engages and positions part of said positive terminal connecting thin plate or said negative terminal connecting thin plate, and
said positive terminal connecting thin plate and said negative terminal connecting thin plate are disposed on said second or third side piece while being partly engaged with said engaging recess.

11. The battery according to claim 4, wherein
a positive terminal connecting thin plate and a negative terminal connecting thin plate are disposed so as to pass above part of said second or third side piece,
each of said second and third side pieces includes an engaging recess to engage and position part of said positive terminal connecting thin plate or said negative terminal connecting thin plate,
said positive terminal connecting thin plate and said negative terminal connecting thin plate are disposed on said second or third side piece while being partly engaged with said engaging recess, and
said positive terminal connecting thin plate and said negative terminal connecting thin plate are partly engaged with the engaging recesses so as to be positioned in a direction perpendicular to one of said side faces of said sheath cans to which the second or third side piece is applied.

12. The battery according to claim 4, wherein
a positive terminal connecting thin plate and a negative terminal connecting thin plate are disposed so as to pass above part of said second or third side piece,
each of said second and third side pieces includes an engaging recess to engage and position part of said positive terminal connecting thin plate or said negative terminal connecting thin plate,
said positive terminal connecting thin plate and said negative terminal connecting thin plate are disposed on said second or third side piece while being partly engaged with said engaging recess, and
the surface of the said positive terminal connecting thin plate or said negative terminal connecting thin plate, which is partly engaged with said engaging recess, is positioned, in the state that said positive terminal connecting thin plate and said negative terminal connecting thin plate are individually partly engaged with the engaging recess on the same plane as the surface of said second or third side piece other than the location at which said engaging recess is formed or at a location lower than the surface of the second or third side piece.

13. The battery according to claim 4, wherein
said battery cells are accommodated in said first and second battery accommodating sections such that the positive terminal of the battery cell accommodating in said first battery accommodating section faces said second side piece and the positive terminal of the battery cell accommodated in said second battery accommodating section faces said third side piece,
each of said second and third pieces has an opening formed for receiving the corresponding positive terminal inserted, and
a positive terminal connecting thin plate includes a thin plate extending on said third side piece or corresponding edge piece and joined at an end to the positive terminal of the battery cell accommodated in said second battery accommodating section which is exposed through the opening of said third side piece and at the other end to the negative terminal of the battery cell accommodated in said first battery accommodating section and an other thin plate extending on said second side piece or corresponding edge piece and joined at an end to the negative terminal of the battery cell accommodated in said first battery accommodating section and at the other end to said connector.

14. The battery according to claim 4, wherein
said second and third side pieces extend along the side faces of said sheath cans of said battery cells,
the positive terminal of the battery cell accommodating in said first battery accommodating section faces said second side piece while the positive terminal of the battery cell accommodated in said second battery accommodating section faces third side piece,
each of said second and third pieces includes an opening that receives the corresponding positive terminal inserted,
two joining portions are provided in a spaced relationship from each other in the extension direction of said second and third side pieces in a positive terminal connecting thin plate to engage with the positive terminal facing through the opening, and
one of the two joining portions is connected to the positive terminal.

15. The battery according to claim 4, wherein
a positive terminal connecting thin plate is disposed in such a manner as to pass above said holding member and interconnect the positive terminal of the battery cell accommodated in said second battery accommodating section and the negative terminal of the battery cell accommodated in said first battery accommodating section and further interconnect the positive terminal of the battery cell accommodating in said first battery cell accommodating section and said connector,
a negative terminal connecting thin plate is disposed in such a manner as to pass above said holding member and interconnect the negative terminal of the battery cell accommodated in said second battery accommodating section and said connector,
the portions at which said positive terminal connecting thin plate and said negative terminal connecting thin plate are connected to the negative terminals of said battery cells are portions of the side faces of said sheath cans of said battery cells on which none of said second and third side pieces exists, and
each of the portions at which said positive terminal connecting thin plate and said negative terminal connecting thin plate are connected to the negative terminals of said battery cells are formed from a thermistor sandwiched between two thin plates.

16. The battery according to claim 4, wherein
a positive terminal connecting thin plate is disposed in such a manner as to pass above said holding member and interconnect the positive terminal of the battery cell accommodated in said second battery accommodating section and the negative terminal of the battery cell accommodated in said first battery accommodating section and further interconnect the positive terminal of the battery cell accommodating in said first battery cell accommodating section and said connector,
a negative terminal connecting thin plate is disposed in such a manner as to pass above said holding member and interconnect the negative terminal of the battery cell accommodated in said second battery accommodating section and said connector,
the portion of said positive terminal connecting thin plate which interconnects the positive terminal of the battery cell accommodated in said second battery accommodating section and the negative terminal of the battery cell accommodated in said first battery accommodating section includes a thin plate which extends on that one of said edge pieces which connects to said fourth side piece, and
said negative terminal connecting thin plate includes a thin plate which extends on the edge piece which connects to said fourth side piece.

17. The battery according to claim 4, wherein
said edge pieces are provided in such a manner as to extend only on one of the upper face and the lower face of said sheath cans of said battery cells accommodated in said first and second battery accommodating sections, and
said battery cells are inserted into said first and second battery accommodating sections from a location of one of said side pieces at which said edge pieces are not provided.

18. The battery according to claim 4, wherein
said edge pieces are provided in such a manner as to extend only on one of the upper face and the lower face of said sheath cans of said battery cells accommodated in said first and second battery accommodating sections, and
said fourth side piece includes an edge piece which extends on the other one of the upper and lower faces of said battery cells accommodated in said first and second battery accommodating sections.

19. The battery according to claim 4, wherein
one of said second and third side pieces is formed separately from said first side piece.

20. The battery according to claim 4, wherein
said second and third side pieces are connected to said fourth side piece.

21. The battery according to claim 4, wherein
said edge pieces are provided in such a manner as to extend only on one of the upper face and the lower face of said sheath cans of said battery cells accommodated in said first and second battery accommodating sections, and
said holding member includes a cutaway portion that allows a remaining central portion except edges of one of the upper and lower faces, which contacts with said edge pieces of said sheath cans of said battery cells accommodated in said first and second battery accommodating sections, to be exposed.

22. The battery according to claim 1, wherein
said battery cell includes a sheath can in the form of a flattened rectangular plate comprising a conductive metal material and including rectangular upper and lower faces positioned at the opposite ends in a thicknesswise direction and four side faces to connect said upper and lower faces to each other, and
said positive terminal of said battery cell is disposed on one of said four side faces in an isolated condition from said sheath can while the remaining location of said sheath can other than the location at which said positive terminal is disposed is formed as the negative terminal of said battery cell.

* * * * *